United States Patent
Takane

(10) Patent No.: US 7,812,801 B2
(45) Date of Patent: Oct. 12, 2010

(54) IMAGING APPARATUS

(75) Inventor: Yasuo Takane, Asaka (JP)

(73) Assignee: Fujifilm Corporation, Tokyo (JP)

( * ) Notice: Subject to any disclaimer, the term of this patent is extended or adjusted under 35 U.S.C. 154(b) by 945 days.

(21) Appl. No.: 11/652,098

(22) Filed: Jan. 11, 2007

(65) Prior Publication Data

US 2007/0165120 A1    Jul. 19, 2007

(30) Foreign Application Priority Data

Jan. 13, 2006    (JP) ............................. 2006-006548

(51) Int. Cl.
G09G 3/36    (2006.01)
(52) U.S. Cl. ............................. 345/87; 345/89; 348/248
(58) Field of Classification Search ............. 345/87–89, 345/102, 166; 348/223.1, 245, 248, 311
See application file for complete search history.

(56) References Cited

U.S. PATENT DOCUMENTS

| | | | | |
|---|---|---|---|---|
| 5,608,455 A | * | 3/1997 | Oda | 348/295 |
| 5,963,251 A | * | 10/1999 | DeLong | 348/249 |
| 6,084,634 A | * | 7/2000 | Inagaki et al. | 348/294 |
| 6,970,193 B1 | * | 11/2005 | Kidono et al. | 348/245 |
| 2003/0160876 A1 | * | 8/2003 | Miyao et al. | 348/223.1 |
| 2004/0130632 A1 | * | 7/2004 | Shiraishi | 348/223.1 |
| 2005/0264661 A1 | * | 12/2005 | Kawanishi et al. | 348/248 |

FOREIGN PATENT DOCUMENTS

JP    7-67038 A    3/1995

* cited by examiner

*Primary Examiner*—Kimnhung Nguyen
(74) *Attorney, Agent, or Firm*—Birch, Stewart, Kolasch & Birch, LLP

(57) ABSTRACT

An aspect of the present invention provides an imaging apparatus comprising: a solid-state image sensor having an effective pixel area and an optical black area; a smear detection device which detects smear intensity and smear occurrence position in a smear occurrence area, in which a smear occurs, in the effective pixel area, based on an output signal obtained from the optical black area of the solid-state image sensor; and a smear correction device which performs smear correction by subtracting a smear correction value corresponding to the smear intensity from an output signal of the smear occurrence area and the vicinity thereof in the effective pixel area.

17 Claims, 19 Drawing Sheets

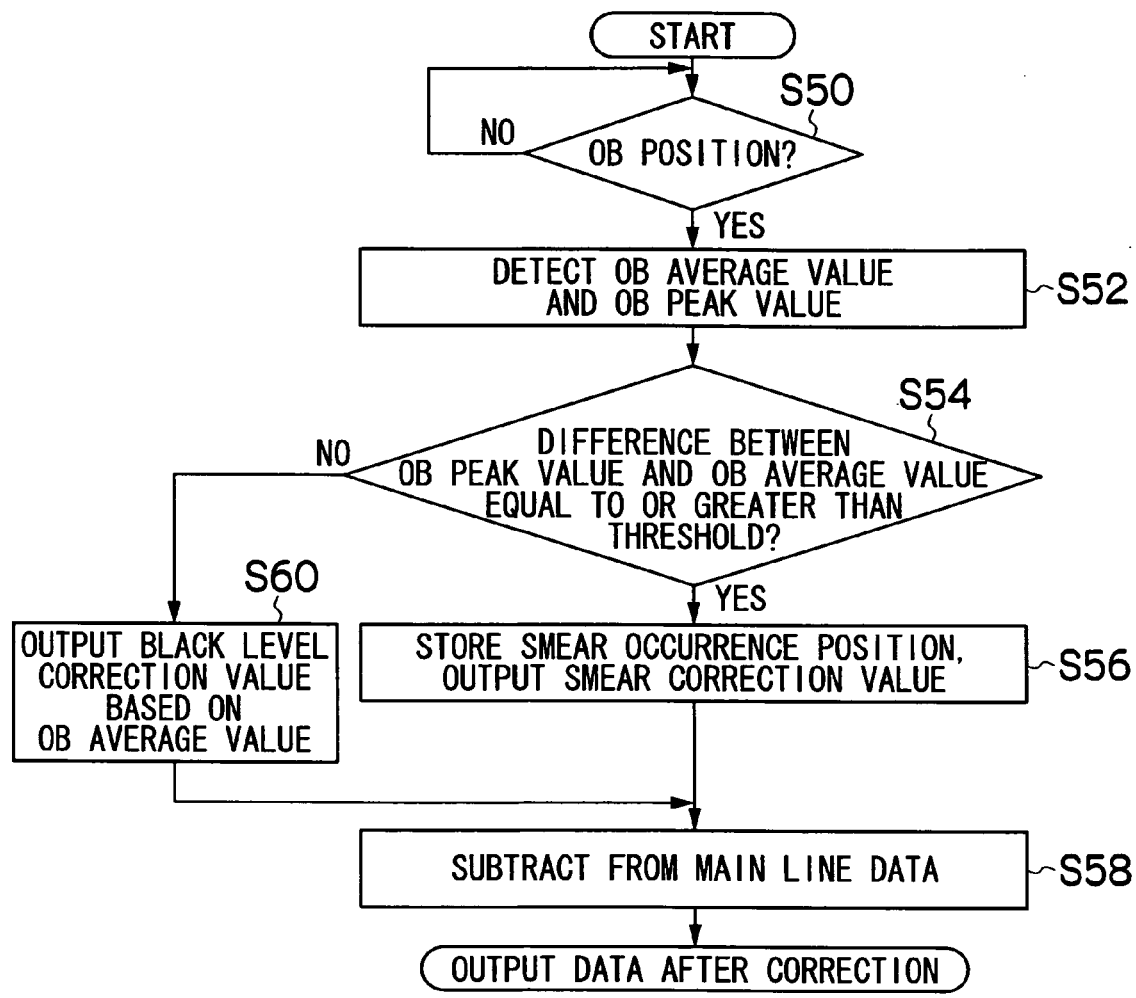

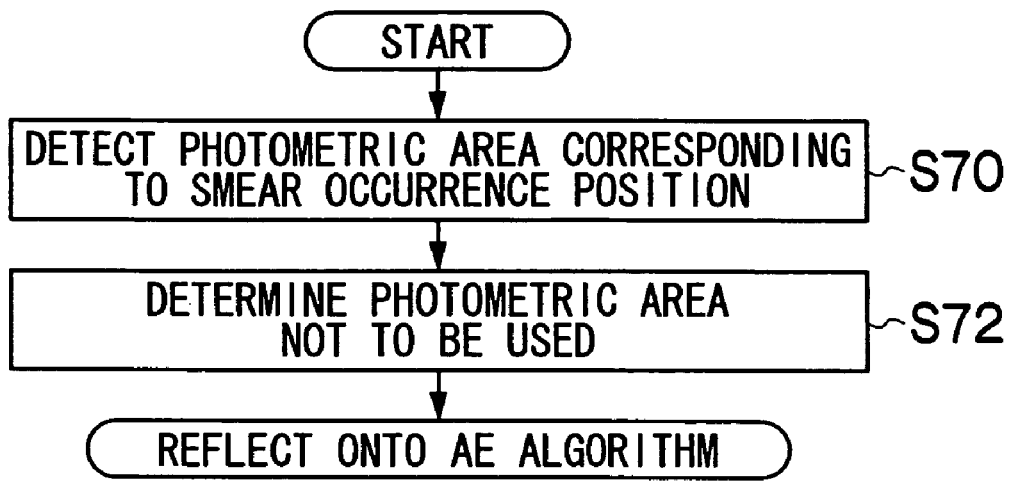
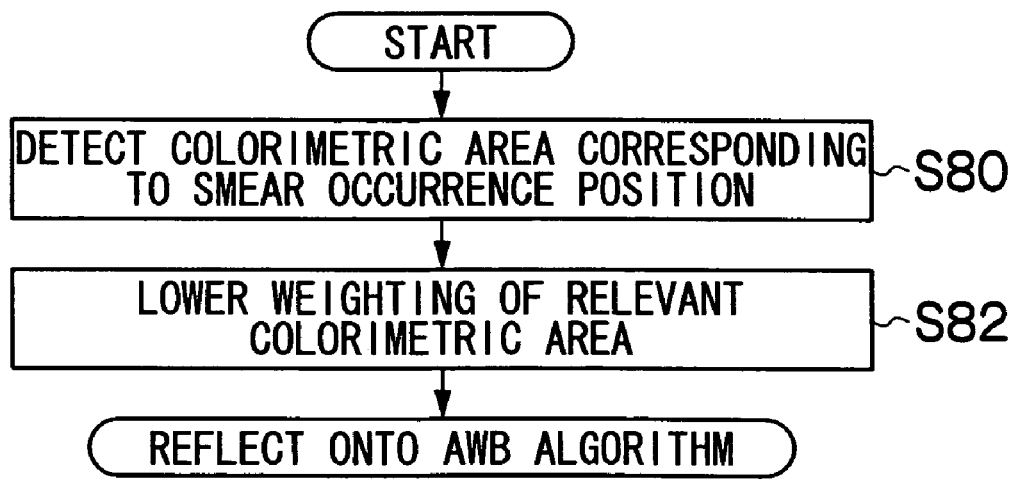

EXAMPLE OF CHROMA SUPPRESS CONTROL-TYPE SMEAR CORRECTION SIGNAL PROCESSING (CCD-RAW TO Y/C)

EXAMPLE OF GAMMA CONTROL-TYPE SMEAR CORRECTION SIGNAL PROCESSING (CCD-RAW TO Y/C)

IMAGING APPARATUS

BACKGROUND OF THE INVENTION

1. Field of the Invention

The present invention relates to an imaging apparatus, and in particular, to a smear correction technique for an imaging apparatus, such as a digital camera and a video camera, having a function for preventing degradation of image quality due to a smear phenomenon.

2. Description of the Related Art

When an image of a high-luminance object, such as the sun or a light, is photographed using an imaging apparatus having a charge coupled device (CCD) image sensor, a bright line in the form of a vertically extending stripe appears in the photographed image. Such a phenomenon is called a smear phenomenon, which is caused by leakage of a charge of a significant portion of incident light during transfer to a vertical transfer channel and subsequent read-out of charges created on the photodiodes (photoelectric conversion elements) of the CCD to the vertical transfer channel, or by leakage of the incident light itself to the vertical transfer channel, which creates a charge in the vertical transfer channel.

To eliminate such a smear phenomenon, in conventional imaging apparatuses, output signals from an optical black area (OB area) composed of a plurality of lines of the CCD image sensor are added and averaged to form one line's worth of signals, which are then stored in a line memory, and the stored signals are subtracted from a signal from an effective pixel area of the CCD image sensor (Japanese Patent Application Laid-Open No. 7-67038).

SUMMARY OF THE INVENTION

In conventional smear correction circuits, in the event that the proportion of a smear component (including a blooming component) to a total screen is significant, a problem may arise in that the subtrahend in relation to the signal at the horizontal pixel position of the smear becomes too large (overcompensation), causing stripe-shaped noises or darkened screens, or otherwise the smear is insufficiently compensated and results in blown highlights. In addition, there is another problem in that such occurrences of stripe-shaped noises and blown highlights as described above reduces accuracy of photometry and color measurement, in turn reducing the accuracy of exposure control (AE) and white balance compensation (AWB).

The present invention has been made in view of such circumstances, and an object of the present invention is to provide an imaging apparatus in which the quality of the smear correction may be improved, and appropriate exposure control (AE) or the like may be performed even when a smear has occurred.

In order to achieve the object described above, an imaging apparatus according to a first aspect of the present invention comprises: a solid-state image sensor having an effective pixel area and an optical black area; a smear detection device which detects smear intensity and smear occurrence position in a smear occurrence area, which is an area where a smear occurs in the effective pixel area, based on an output signal obtained from the optical black area of the solid-state image sensor; and a smear correction device which performs smear correction by subtracting a smear correction value corresponding to the smear intensity from an output signal of the smear occurrence area and the vicinity thereof in the effective pixel area.

The imaging apparatus according to the first aspect enables reduction of smears that take vertical stripe shapes as well as vertical stripe-shaped noises caused by erroneous recognition of a smear detection circuit by performing smear correction not only on a smear occurrence position but also on the pixels in the vicinity of the smear occurrence position.

An imaging apparatus according to a second aspect of the present invention comprises: a solid-state image sensor having an effective pixel area and an optical black area; a smear detection device which detects smear intensity and smear occurrence position in a smear occurrence area, which is an area where a smear occurs in the effective pixel area, based on an output signal obtained from the optical black area of the solid-state image sensor; a smear occurrence proportion calculation device which calculates a smear occurrence proportion which is the proportion of the area of the smear occurrence area to the entire effective pixel area; and a black level correction device which performs black level correction by calculating a black level correction value based on the smear occurrence proportion and subtracting the black level correction value from all output signals of the effective pixel area.

An imaging apparatus according to a third aspect of the present invention is the imaging apparatus according to the first aspect, further comprising: a smear occurrence proportion calculation device which calculates a smear occurrence proportion which is the proportion of the area of the smear occurrence area to the entire effective pixel area; and a black level correction device which performs black level correction by calculating a black level correction value based on the smear occurrence proportion and subtracting the black level correction value from all output signals of the effective pixel area.

The imaging apparatus according to the second or third aspect enables correction of variations in the black level of the entire screen attributable to smear occurrences by performing black level correction according to the proportion of the area of the smear occurrence area to the entire screen (the entire effective pixel area).

An imaging apparatus according to a fourth aspect of the present invention is the imaging apparatus according to the first to third aspects, further comprising: a photometry device which calculates exposure conditions by splitting the effective pixel area into a plurality of photometric areas; and an exposure control device which performs exposure control based on the calculated exposure conditions, wherein the photometry device either reduces weighting on an output signal in a photometric area located at the smear occurrence position or at the smear occurrence position and its vicinity, or does not use an output signal in the photometric area located at the smear occurrence position or at the smear occurrence position and its vicinity during calculation of the exposure conditions.

The imaging apparatus according to the fourth aspect enables prevention of blown highlights of a screen caused by smear occurrences and improvement of image quality in an imaging apparatus comprising a split photometry-type exposure control device which splits the screen into a plurality of photometric areas to calculate exposure conditions (photometry), by not using a photometric area that includes the smear occurrence area for measurement of exposure conditions.

An imaging apparatus according to a fifth aspect of the present invention is the imaging apparatus according to the first to third aspects, further comprising: a color information acquisition device which splits the effective pixel area into a plurality of colorimetric areas and respectively acquires color information from each colorimetric area; a white balance gain calculation device which calculates white balance gain based on the color information; and a white balance control device which performs white balance control based on the calculated white balance gain, wherein the white balance gain calculation device either reduces weighting on the color information in a photometric area located at the smear occurrence position or at the smear occurrence position and its vicinity, or does not use the color information in the photometric area located at the smear occurrence position or at the smear occurrence position and its vicinity during calculation of the white balance gain.

The imaging apparatus according to the fifth aspect enables prevention of deviations of white balance caused by smear occurrences and improvement of image quality in an imaging apparatus comprising a split colorimetric-type white balance control device which splits the screen into predetermined areas to calculate color information, by not using a calorimetric area that includes the smear occurrence area for measurement of color information.

An imaging apparatus according to a sixth aspect of the present invention is the imaging apparatus according to the second or third aspect, further comprising a chroma suppress processing device which performs chroma suppress processing to adjust saturation of a digital signal, wherein the chroma suppress processing device alters parameters of chroma suppress processing according to the smear occurrence proportion.

The imaging apparatus according to the sixth aspect enables reduction of occurrences of color noises in blown highlights caused by occurrences of smears (including blooming).

An imaging apparatus according to a seventh aspect of the present invention is the imaging apparatus according to the second or third aspect, further comprising a gamma correction device which performs gamma correction on the digital signal based on predetermined γ tables, wherein the gamma correction device selects a γ table according to the smear occurrence proportion.

The imaging apparatus according to the seventh aspect enables selection of a γ table in accordance with a varied dynamic range in the event that a variation in the dynamic range is caused by occurrences of smears (including blooming).

An imaging apparatus according to an eighth aspect of the present invention is the imaging apparatus according to the third aspect having a live view mode which displays a live view on a display screen and an actual imaging mode for performing taking of an image, based on a digital signal obtained from the solid-state image sensor, the imaging apparatus further comprising a storage device which stores the smear correction value and the smear occurrence proportion when a smear is detected by the smear detection device, wherein the smear correction device performs smear correction based on the stored smear correction value and smear occurrence proportion when performing photometry under the actual imaging mode.

The imaging apparatus according to the eighth aspect enables reduction of the time required for acquiring exposure conditions during actual imaging by detecting a smear occurrence to detect and store a smear correction value or a smear occurrence proportion in advance during live view mode prior to imaging, and by using such stored parameters for smear correction during photometry prior to imaging.

An imaging apparatus according to a ninth aspect of the present invention is the imaging apparatus according to the eighth aspect, further comprising a device which lowers the gain applied to an output signal read out from the solid-state image sensor when either the smear correction value is equal to or greater than a predetermined value, or the smear occurrence proportion is equal to or greater than a predetermined value.

The imaging apparatus according to the ninth aspect enables suppression of influences of a smear and improvement of image quality by lowering analog gain or ISO sensitivity when the smear has occurred in a wide area across the entire screen or when the smear is intense.

According to the present invention, smear correction capabilities may be enhanced not only in the smear occurrence position, and exposure control (AE), white balance control, chroma suppress processing, gamma correction or the like may be performed in an appropriate manner even when during a occurrence of a smear.

BRIEF DESCRIPTION OF THE DRAWINGS

FIG. 11 is a flowchart for illustrating a flow of processing of a smear correction method according to the third embodiment of the present invention;

FIG. 12 is a flowchart illustrating a procedure for specifying a photometric area which will not be used in photometry;

FIG. 13 is a flowchart illustrating a procedure for specifying a colorimetric area which will not be used in color information calculation;

DETAILED DESCRIPTION OF THE PREFERRED EMBODIMENTS

Preferred embodiments of an imaging apparatus according to the present invention will now be described with reference to the attached drawings.

[Structure of Solid-State Image Sensor]

Figure 1:
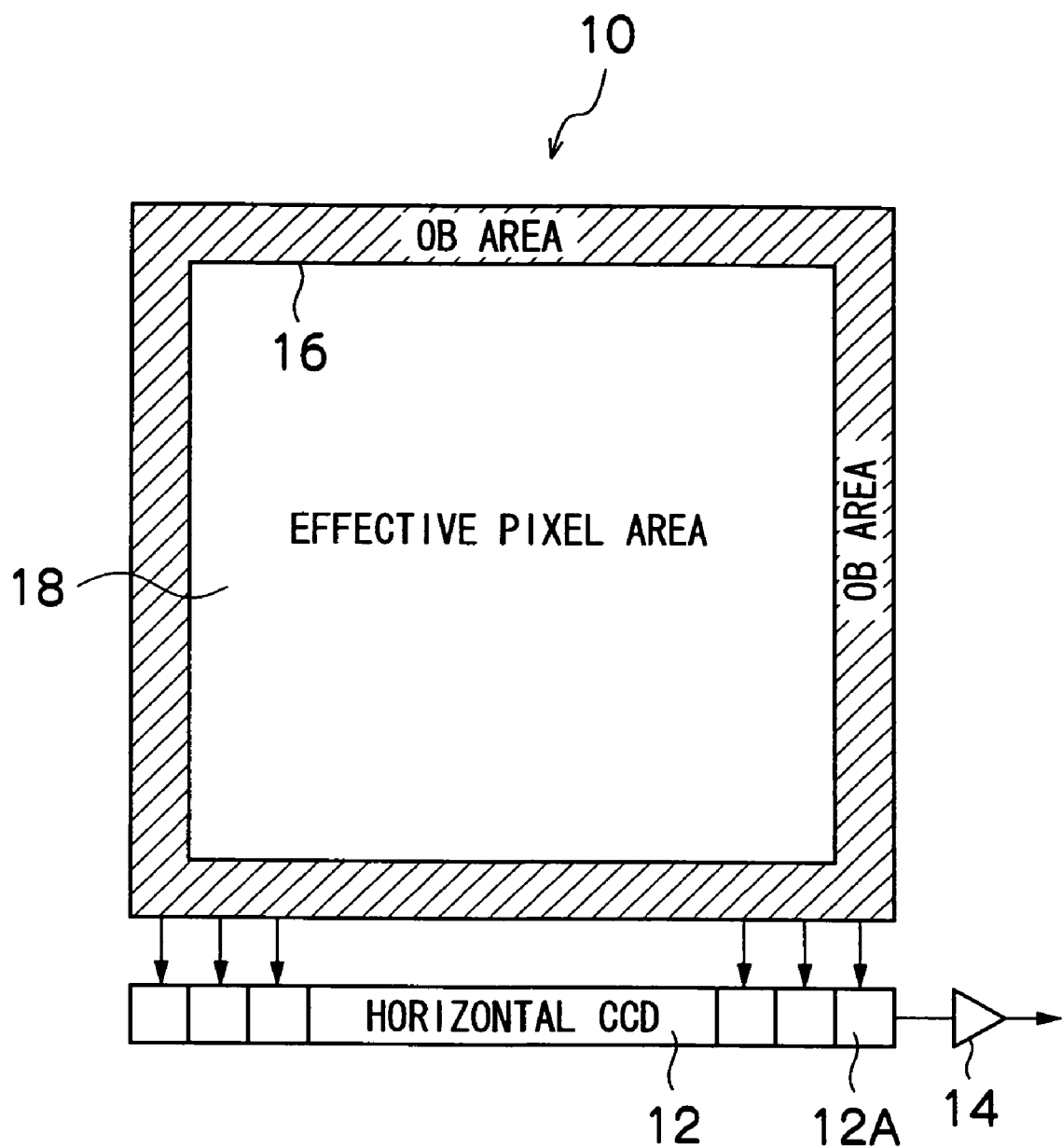
FIG. 1 is a schematic plan view of an exemplary CCD solid-state image sensor.

First, a structure of a CCD image sensor used in an imaging apparatus according to the present invention will be described. FIG. 1 is a schematic plan view of an exemplary CCD solid-state image sensor (hereinafter referred to as "CCD").

A CCD 10 is a two-dimensional imaging device (image sensor) that comprises an array of multiple light-receiving cells arranged in a horizontal direction (a row direction) and in a vertical direction (a column direction) at a certain array period. A vertical transfer channel (a vertical CCD) is formed at the side of each light-receiving cell. Charges accumulated in the light-receiving cells are passed to the respective vertical CCDs when the CCD is driven, and in turn, the charges on the vertical CCDs are sequentially transferred in a downward direction in FIG. 1.

A horizontal transfer channel (a horizontal CCD) 12 is disposed at a lower part of the CCD 10 (a bottom edge-side of the vertical CCD), and receives one line's worth of signal charges sequentially transferred from the vertical CCD. The horizontal CCDs 12 are two-phase driven and sequentially transfer the charges thereon in a horizontal direction. The horizontal CCD 12 at the last stage 12A (the rightmost stage in FIG. 1) is connected to an output section 14. The output section 14, comprising an output amplifier, detects the signal charges inputted thereto and outputs the signal charges in the form of signal voltages. In this manner, signals produced by photoelectric conversion by the light-receiving cells are output in the form of a dot-sequential signal sequence.

In addition, light-shielded optical black areas (OB areas) 16 are formed on the four sides of the CCD 10, and an effective pixel area 18, which is not light-shielded, is also provided. In the present embodiment, the OB areas 16 are assumed to compose the uppermost eight lines of the CCD 10.

[Example of Structure of Imaging Apparatus]

Figure 2:
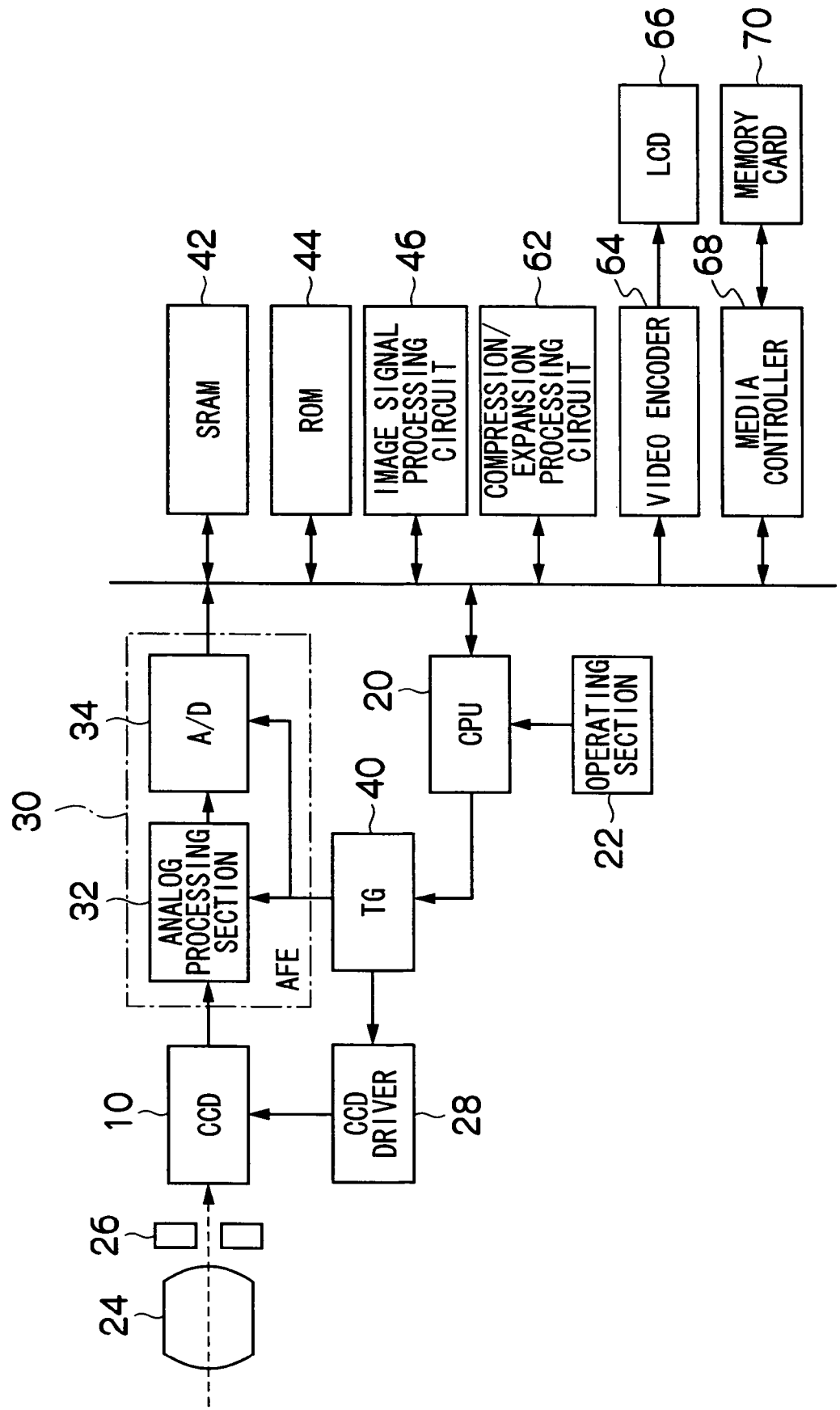
FIG. 2 is a block diagram showing an imaging apparatus according to an embodiment of the present invention.

An embodiment of an imaging apparatus according to the present invention will now be described. FIG. 2 is a block diagram showing an imaging apparatus according to an embodiment of the present invention. The above-described CCD 10 is mounted on the imaging apparatus shown in FIG. 2.

The operation of the entire imaging apparatus is comprehensively controlled by a central processing unit (CPU) 20. An operating section 22 comprises a power supply switch, a release button, a mode switch for switching between a photography mode and a playback mode, and a multifunction crosshair key for outputting various command signals, such as zooming and frame-by-frame advance, and the like. Various operation signals from the operating section 22 are arranged to be supplied to the CPU 20. In addition to a static-image photography mode (static image mode) in which a static image is photographed each time the release button is turned on, the imaging apparatus also has a moving-image photography mode (moving image mode) in which the apparatus takes a sequence of images at a predetermined frame rate while the release button is turned on. An appropriate mode may be selected from among these modes by operation inputted from the operating section 22.

When photographing a static image or a moving image, image light representing a subject is focused on a light-receiving surface of the CCD 10 via a photographic lens 24 and a diaphragm 26. A charge accumulated on the CCD 10 is read out as a voltage signal by a CCD driver 28 to be outputted to an analog front end (AFE) 30.

The AFE 30 comprises an analog processing section 32 including a correlated double sampling (CDS) circuit, a color separation circuit, a gain control circuit or the like, and an A/D converter 34. The AFE 30 performs correlated double sampling of input signals, performs color separation to separate the inputted signals into color signals of R, G and B, and adjusts the signal level of each color signal. The analog signal outputted from the analog processing section 32 is converted into a 12-bit digital signal by the A/D converter 34, and then applied to an image signal processing circuit 46 as CCD-RAW data of R, G and B.

A timing generator (TG) 40 applies a timing signal to the CCD driver 28 and the AFE 30 in accordance with an instruction from the CPU 20. The timing signal synchronizes the respective circuits.

A memory (SRAM [static RAM]) 42 functions as a work memory that temporarily stores image data or is used in image processing, to be described later. A ROM 44 previously stores a program, an adjusted value and the like, which are appropriately read out.

Figure 3:
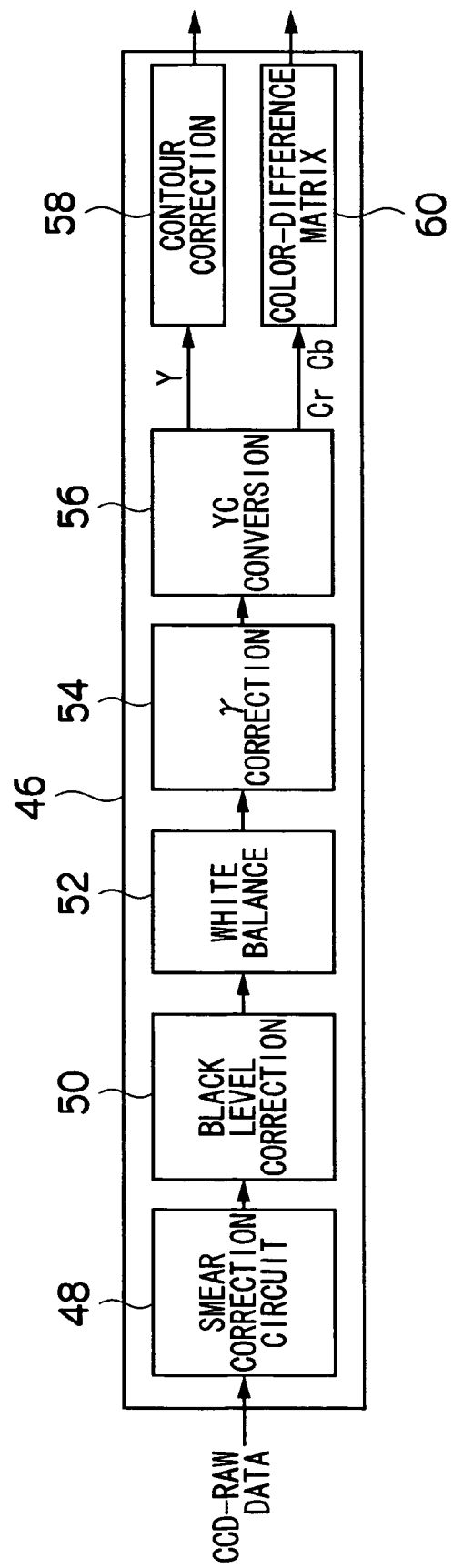
FIG. 3 is a block diagram showing an exemplary internal structure of an image signal processing circuit.

As shown in FIG. 3, an image signal processing circuit 46 comprises a smear correction circuit 48, a black level correction circuit 50, a white balance adjustment circuit 52, a gamma correction circuit 54, a YC conversion circuit 56, a contour correction circuit 58, a color-difference matrix circuit 60 and the like, and performs various signal processing on CCD-RAW data inputted from the AFE 30.

The smear correction circuit 48 removes any smear components from data contaminated by the same in the inputted CCD-RAW data. Details of the smear correction circuit 48 will be described later. The smear corrected-data then undergoes black level correction at the black level correction circuit 50. The black level correction is performed with reference to the cumulative average value of data obtained from the OB area 16 shown in FIG. 1.

Subsequently, the white balance adjustment circuit 52 and the gamma correction circuit 54 respectively perform white balance adjustment and gamma correction of the R, G and B data, while the YC conversion circuit 56 performs YC conversion on the R, G and B data to generate luminance data "Y" and color-difference data "Cr" and "Cb". The brightness data "Y" is subjected to contour enhancement processing by the contour correction circuit 58, while the color-difference data "Cr" and "Cb" undergoes color correction by the color-difference matrix circuit 60 in order to enhance color reproducibility.

Image data (YC data) processed by the image signal processing circuit 46 is encoded by a video encoder 64 and outputted to a liquid crystal display (LCD) monitor 66 provided on the rear face of the camera. The subject image is thereby displayed on a display screen of the LCD 66.

In addition, the YC data processed by the image signal processing circuit 46 is also outputted to a compression/expansion processing circuit 62 to undergo predetermined compression processing to a format such as JPEG (joint photographic experts group), and is then recorded in a memory card 70 via a media controller 68.

First Embodiment

Figure 4:
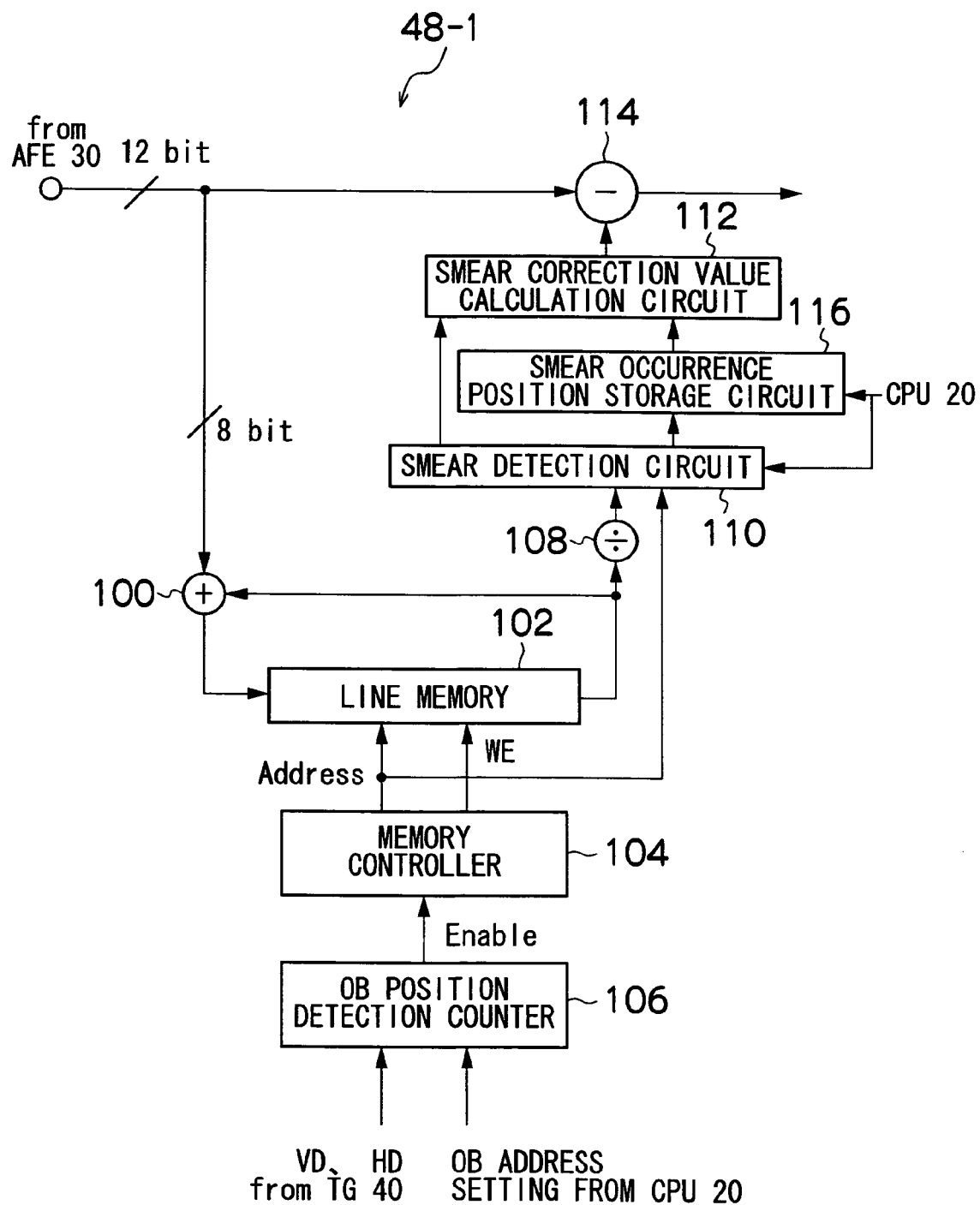
FIG. 4 is a block diagram showing a smear correction circuit according to a first embodiment of the present invention.

The above-mentioned smear correction circuit 48 will now be described. FIG. 4 is a block diagram showing a smear correction circuit according to a first embodiment of the present invention.

A smear correction circuit 48-1 shown in FIG. 4 comprises an adder circuit 100, a line memory 102, a memory controller 104, an OB position detection counter 106, a divider circuit 108, a smear detection circuit 110, a smear correction value calculation circuit 112, a smear occurrence position storage circuit 116, and a subtraction circuit 114.

The adder circuit 100 is arranged so that 8-bit data among the 12-bit CCD-RAW data from the AFE 30 is inputted thereto. The 8 bits are, for example, low-order 8 bits of the 12 bits. However, the low-order 8 bits need not be the first to eighth low-order bits, and for instance, may instead be the third to tenth low-order bits. This is because the characteristics of the smear signal allow compression to be performed on an area which does not require a high signal precision.

The adder circuit 100 has another input arranged to receive 8-bit data outputted from the line memory 102. The adder circuit 100 sums the data inputted from the AFE 30 and the data outputted from the line memory 102 a predetermined number of times (for instance, eight times). The divider circuit 108 divides the sum calculated by the adder circuit 100 by the number of performed additions to calculate an average value of the inputted data, and outputs the average value to the line memory 102.

The line memory 102 is capable of storing 8-bit data equivalent to one line of the CCD 10. Addressing and data writing on the line memory 102 on which data reading/writing is performed are performed in accordance with an address signal "Address" and a write enable signal "WE" from the memory controller 104.

The memory controller 104 outputs the address signal "Address" and the write enable signal "WE" according to an enable signal "Enable" inputted from the OB position detection counter 106. More specifically, the OB position detection counter 106 is reset by a vertical synchronization signal VD inputted from the TG 40, and subsequently counts horizontal synchronization signals HD inputted from the TG 40. This enables the OB position detection counter 106 to determine which line of the AFE 30 the data currently being output is originating from. In addition, the OB position detection counter 106 has been set by the CPU 20 with the address of the OB area 16 of the CCD 10. The OB position detection counter 106 outputs the enable signal "Enable" to the memory controller 104 to enable operation of the memory controller 104 only when the data of the line of pixels of the OB area 16 (in the present embodiment, the uppermost two lines of the CCD 10) is being inputted.

Therefore, when the data of the OB area 16 is being inputted, the adder circuit 100 and the line memory 102 are used to calculate a sequence of a single line's worth of data by vertically adding and averaging the data from the eight lines of the OB area 16.

In this manner, the line memory 102 stores and retains the sequence of a single line's worth of data of the OB area 16. The data sequence is then outputted to the smear detection circuit 110 along with the address signal "Address" (a signal corresponding to a horizontal pixel position in that one line).

Figure 5:
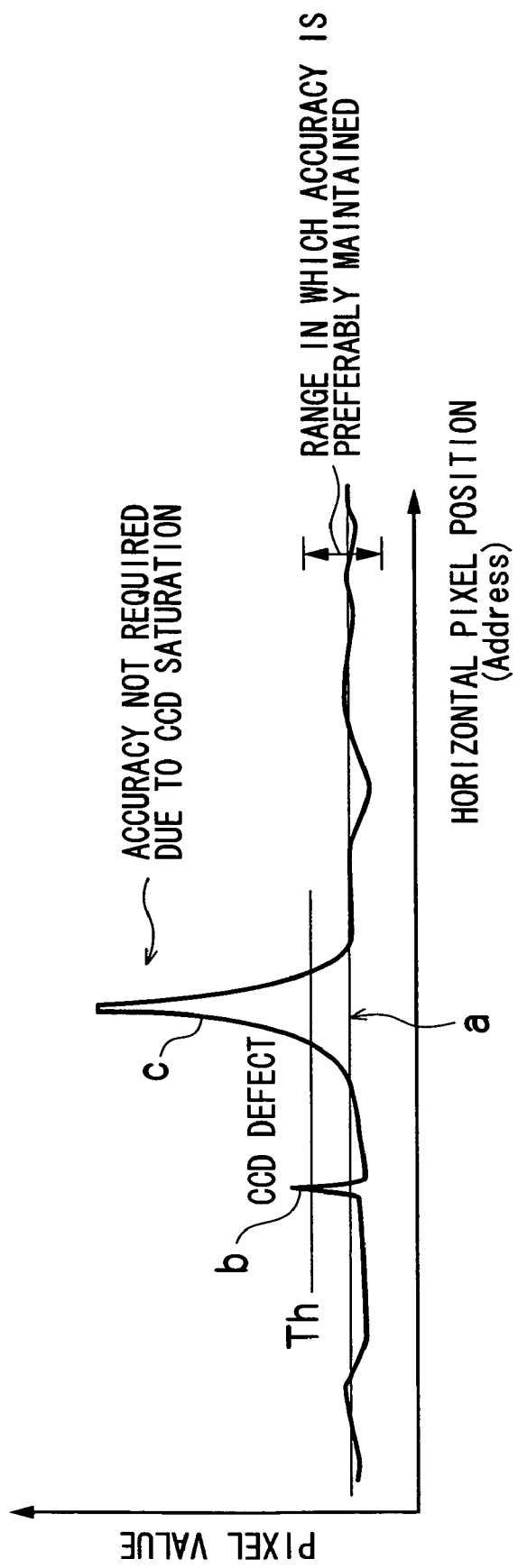
FIG. 5 shows an example of an averaged data sequence (OB values) for one line of the OB area 16.

FIG. 5 shows an example of an averaged data sequence (OB values) for one line of the OB area 16. In FIG. 5, reference character "a" denotes an average value of the data of the entire OB area of the CCD 10, while reference characters "b" and "c" respectively denote values significantly greater than the average value "a". Reference character "b" indicates a position where a pixel defect in the OB area results in a significant value, while reference character "c" indicates a position where a significant value is caused by a smear component introduced into the OB area.

Another input of the smear detection circuit 110 receives a predetermined threshold "Th" for smear detection from the CPU 20. As shown in FIG. 5, the smear detection circuit 110 detects a position of data exceeding the threshold "Th", among the averaged one line's worth of OB values of the OB area 16, as a smear occurrence position. The smear correction value calculation circuit 112 calculates the smear correction value for the data of the same position translated on a main line. In other words, the average value of the data of the OB area is subtracted from the OB value exceeding the threshold "Th", and the difference value is determined as the smear correction value. The smear correction value calculation circuit 112 outputs the smear correction value thus calculated to the subtraction circuit 114.

Another input of the subtraction circuit 114 receives the main line data. The subtraction circuit 114 subtracts the smear correction value from the main line data, and outputs the difference as smear-corrected data. The smear correction value calculation circuit 112 outputs, to the subtraction circuit 114, a smear correction value for the same address as the horizontal address of the main line data which is applied to the subtraction circuit 114.

The smear occurrence position storage circuit 116 stores positional information of a pixel (horizontal pixel position information) at which a smear has been detected by the smear detection circuit 110.

Figure 6:
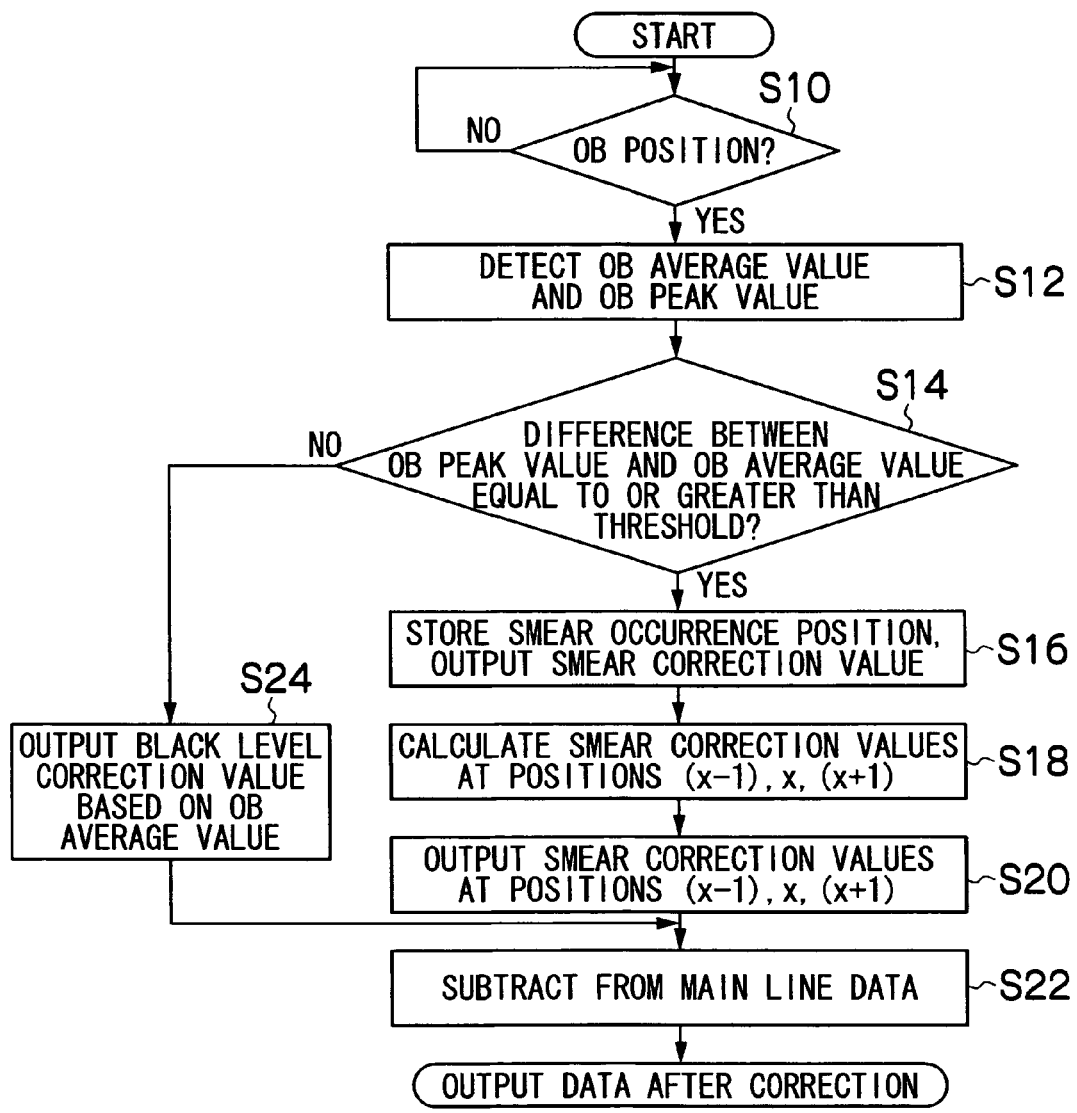
FIG. 6 is a flowchart for illustrating a flow of processing of a smear correction method according to the first embodiment of the present invention.

FIG. 6 is a flowchart for illustrating a flow of processing of a smear correction method according to the first embodiment of the present invention. First, when data (CCD-RAW data) is inputted from the AFE 30, determination is made on whether the data is related to an OB area (step S10). If it is determined that the data relates to an OB area, an average value of all the data of the OB area (average OB value) is calculated, and eight lines' worth of data of the OB area 16 is vertically averaged to calculate a data sequence for one line (OB peak value) (step S12).

Figure 7:
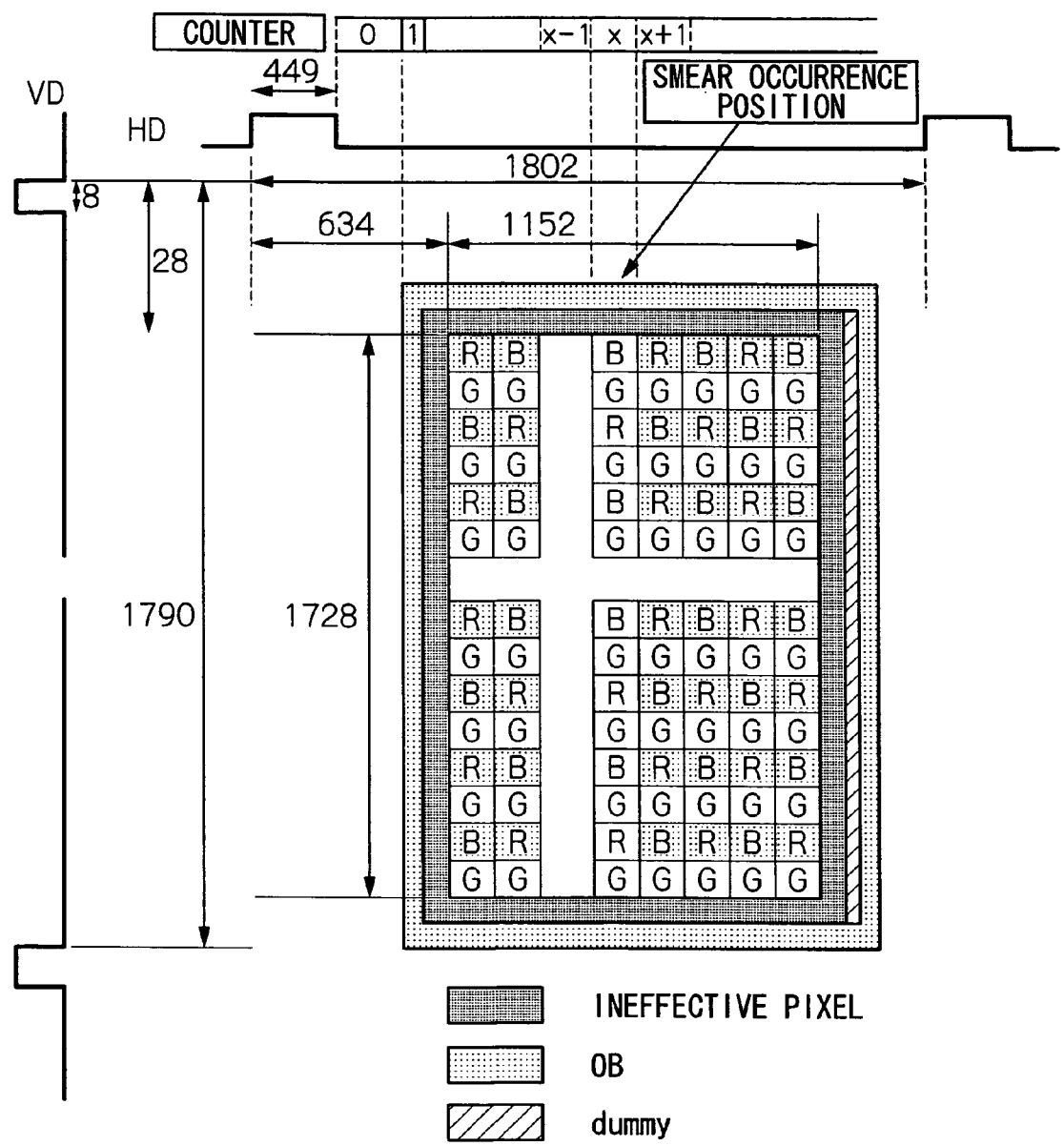
FIG. 7 is schematic diagram of a vicinity of a smear occurrence pixel of a CCD.

Next, for each horizontal pixel position, determination is made on whether the difference between the OB peak value at the pixel position and the OB average value is equal to or greater than a predetermined threshold (step S14). If the difference is equal to or greater than the predetermined threshold (Yes in step S14), a horizontal pixel position (smear occurrence position) "x" is acquired from the smear detection circuit 110 and stored in the smear occurrence position storage circuit 116. In addition, the smear correction value calculation circuit 112 outputs the difference between the OB peak value at the pixel position and the OB average value as a smear correction value to the subtraction circuit 114 (step S16). Furthermore, smear correction values are calculated for pixels (at positions [x−1], [x+1]) in the vicinity of the smear occurrence position "x" shown in FIG. 7 (step S18), and are outputted to the subtraction circuit 114 (step S20). The subtraction circuit 114 subtracts the smear correction value from the main line data (step S22) to perform smear correction. In step S18, the smear correction values at pixels (at positions [x−1], [x+1]) in the vicinity of the smear occurrence position "x" may be calculated by, for instance, multiplying the smear correction value by a coefficient obtained by interpolating the smear correction value and OB average value of the position "x".

On the other hand, if the difference is below the predetermined threshold (No in step S14), the black level correction circuit 50 calculates black level correction data based on the OB average value calculated in step S12 (step S24), and outputs the black level correction data to the subtraction circuit 114. The subtraction circuit 114 then subtracts the black level correction value from the main line data (step S22) to perform black level correction.

According to the present embodiment, reduction of stripe-shaped smears as well as stripe-shaped noises caused by erroneous recognition by the smear detection circuit 110 may be achieved by performing smear correction not only on a smear occurrence position but also on the pixels in the vicinity of the smear occurrence position.

Although the present embodiment has been arranged so that smear correction is performed on two pixels (position [x−1], [x+1]) adjacent to a smear occurrence position "x", smear correction may alternatively be performed on, for instance, a number of pixels on each side of the smear occurrence position "x" according to respective distances therefrom.

Second Embodiment

Figure 8:
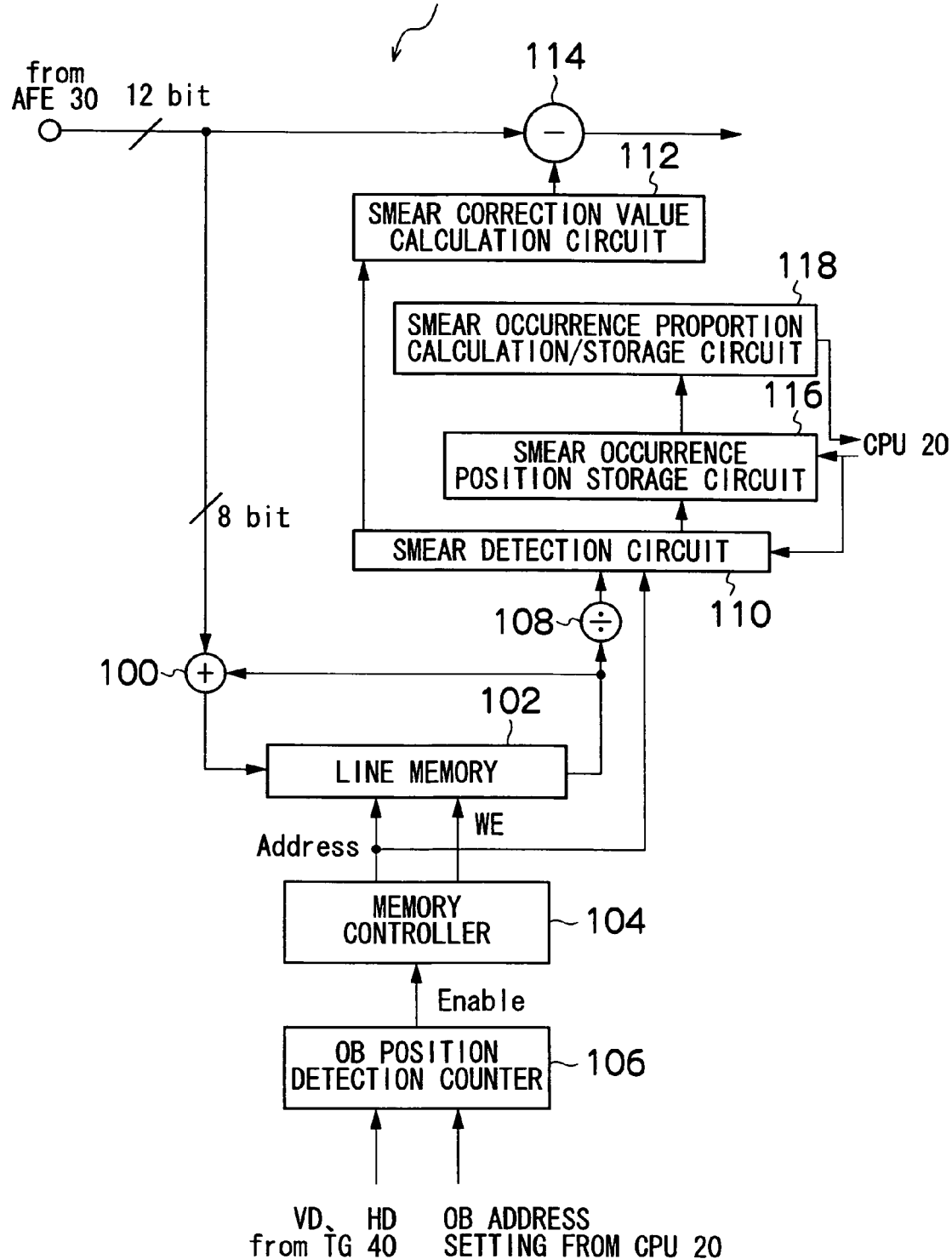
FIG. 8 is a block diagram showing a smear correction circuit according to a second embodiment of the present invention.

A second embodiment of the present embodiment will now be described. FIG. 8 is a block diagram showing a smear correction circuit according to the second embodiment of the present invention. In the following description, the same components as in the first embodiment shown in FIG. 4 are designated by the same reference numerals, and detailed description thereof will be omitted.

A smear correction circuit 48-2 shown in FIG. 8 comprises an adder circuit 100, a line memory 102, a memory controller 104, an OB position detection counter 106, a divider circuit 108, a smear detection circuit 110, a smear correction value calculation circuit 112, a smear occurrence position storage circuit 116, a subtraction circuit 114, and a smear occurrence proportion calculation/storage circuit 118.

The smear occurrence proportion calculation/storage circuit 118 is a device which calculates and stores a proportion of the smear occurrence area to the entire effective pixel area (smear occurrence proportion). A smear occurrence proportion is represented, for instance, by a ratio of a number of smear occurrence positions "x" to the number of horizontal pixels in the effective pixel area.

Figure 9:
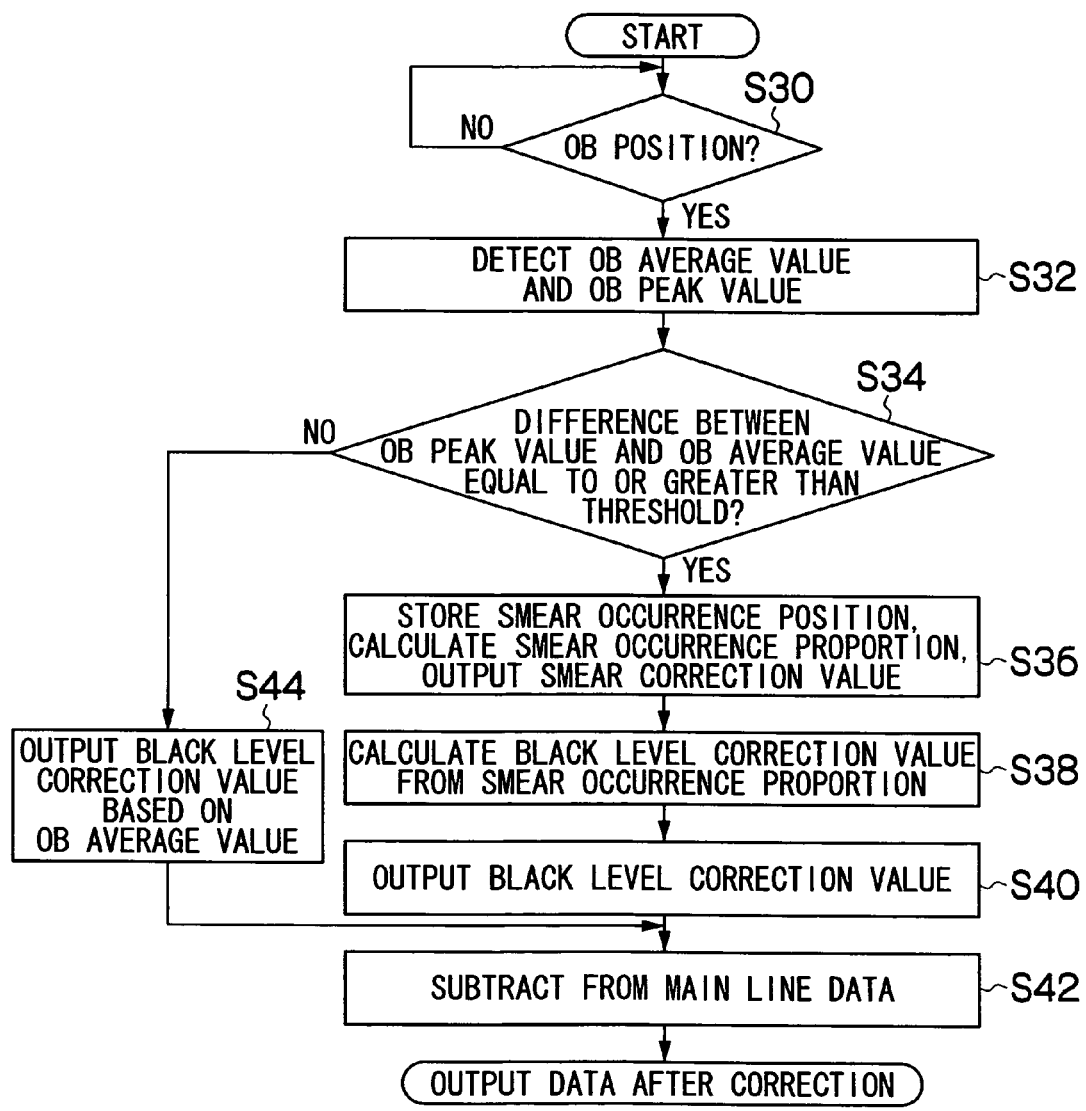
FIG. 9 is a flowchart for illustrating a flow of processing of a smear correction method according to the second embodiment of the present invention.

FIG. 9 is a flowchart for illustrating a flow of processing of a smear correction method according to the second embodiment of the present invention. First, when data (CCD-RAW data) is inputted from the AFE 30, determination is made on whether the data is related to an OB area (step S30). If it is determined that the data relates to an OB area, an average value of all the data of the OB area (average OB value) is calculated, and eight lines' worth of data of the OB area 16 is vertically averaged to calculate a data sequence for one line (OB peak value) (step S32).

Next, for each horizontal pixel position, determination is made on whether the difference between the OB peak value at the pixel position and the OB average value is equal to or greater than a predetermined threshold (step S34). If the difference is equal to or greater than the predetermined threshold (Yes in step S34), a horizontal pixel position (smear occurrence position) "x" is acquired from the smear detection circuit 110 and stored in the smear occurrence position storage circuit 116, and at the same time, the smear occurrence proportion calculation/storage circuit 118 calculates a smear occurrence proportion. In addition, the smear correction value calculation circuit 112 outputs the difference between the OB peak value at the pixel position and the OB average value as a smear correction value to the subtraction circuit 114 (step S36).

Next, the black level correction circuit 50 calculates a black level correction value based on the smear occurrence proportion calculated in step S16 (step S38), and outputs the black level correction value to the subtraction circuit 114 (step S40). The subtraction circuit 114 then subtracts the smear correction value and the black level correction value from the main line data (step S42) to perform smear correction and black level correction.

On the other hand, if the difference is below the predetermined threshold (No in step S34), the black level correction circuit 50 calculates black level correction data based on the OB average value calculated in step S32 (step S44), and outputs the black level correction data to the subtraction circuit 114. The subtraction circuit 114 then subtracts the black level correction value from the main line data (step S42) to perform black level correction.

According to the present invention, correction of variation in the black level of the entire screen attributable to smear occurrences may be achieved by performing black level correction according to the proportion of the area of the smear occurrence area to the entire screen (entire effective pixel area). For instance, in the event that the area of the smear occurrence area is large and the screen is thereby whitened, correction may be performed so as to blacken the entire screen.

Third Embodiment

Figure 10:
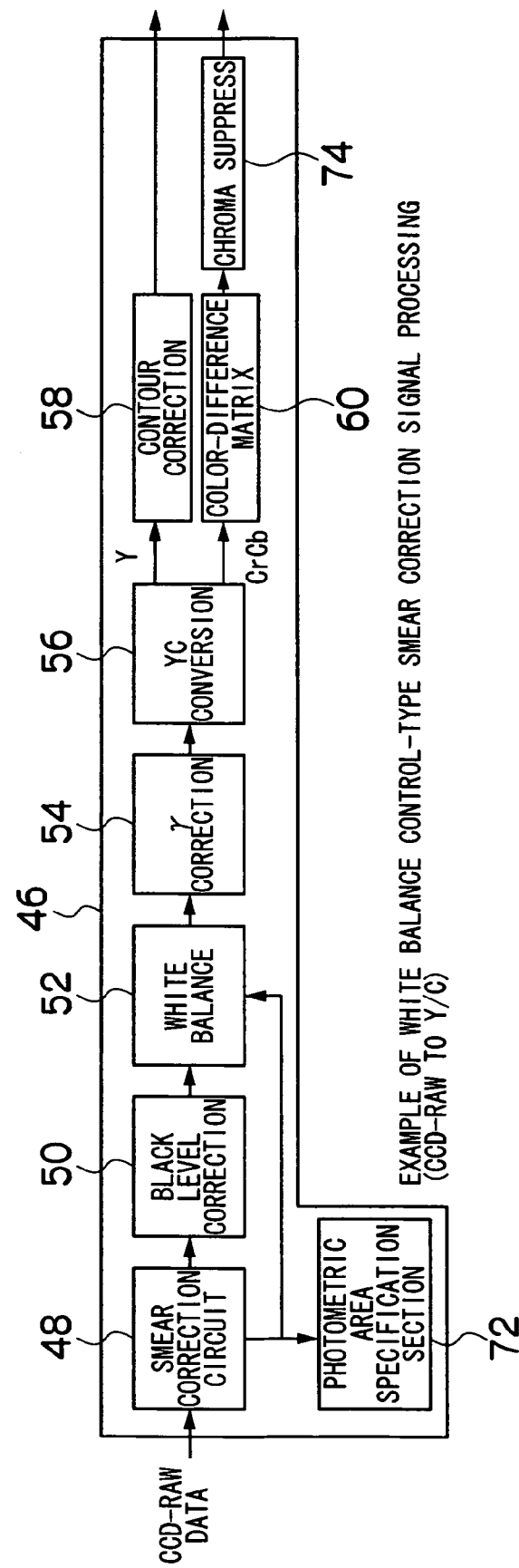
FIG. 10 is a block diagram showing an image signal processing circuit according to a third embodiment of the present invention.

A third embodiment of the present embodiment will now be described. FIG. 10 is a block diagram showing an image signal processing circuit according to the third embodiment of the present invention. As shown in FIG. 10, an image signal processing circuit 46 comprises a smear correction circuit 48, a black level correction circuit 50, a white balance adjustment circuit 52, a gamma correction circuit 54, a YC conversion circuit 56, a contour correction circuit 58 and a color-difference matrix circuit 60, and further comprises a photometric area specification section 72.

FIG. 11 is a flowchart for illustrating a flow of processing of a smear correction method according to the third embodiment of the present invention. First, when data (CCD-RAW data) is inputted from the AFE 30, determination is made on whether the data is related to an OB area (step S50). If it is determined that the data relates to an OB area, an average value of all the data of the OB area (average OB value) is calculated, and eight lines' worth of data of the OB area 16 is vertically averaged to calculate a data sequence for one line (OB peak value) (step S52).

Next, for each horizontal pixel position, determination is made on whether the difference between the OB peak value at the pixel position and the OB average value is equal to or greater than a predetermined threshold (step S54). If the difference is equal to or greater than the predetermined threshold (Yes in step S54), a horizontal pixel position (smear occurrence position) "x" is acquired from the smear detection circuit 110 and stored in the smear occurrence position storage circuit 116. In addition, the smear correction value calculation circuit 112 outputs the difference between the OB peak value at the pixel position and the OB average value as a smear correction value to the subtraction circuit 114 (step S56). The subtraction circuit 114 then subtracts the smear correction value from the main line data (step S58) to perform smear correction.

On the other hand, if the difference is below the predetermined threshold (No in step S54), the black level correction circuit 50 calculates black level correction data based on the OB average value calculated in step S52 (step S60), and outputs the black level correction data to the subtraction circuit 114. The subtraction circuit 114 subtracts the black level correction value from the main line data (step S58) to perform black level correction.

When a smear occurrence position is acquired in step S56, as shown in FIG. 12, the photometric area specification section 72 detects a photometric area corresponding to the smear occurrence position from the photometric areas used for measuring exposure conditions (step S70). The detected photometric area is removed from the photometric areas used for measuring exposure conditions (step S72), and exposure control (AE) is performed. In addition, as shown in FIG. 13, the while balance adjustment circuit 52 detects a photometric area corresponding to the smear occurrence position from the photometric areas used for acquiring color information (step S80). The detected photometric area is removed from the photometric areas used for acquiring color information (step S82), and automatic white balance control (AWB) is performed.

According to the present embodiment, blown highlights caused by smear occurrences may be prevented and image quality may be improved in an imaging apparatus comprising a split photometry-type exposure control device which splits the screen into a plurality of photometric areas to measure exposure conditions, by not using a photometric area including the smear occurrence area for measurement of exposure conditions.

Furthermore, according to the present embodiment, deviations in white balance caused by smear occurrences may be prevented to improve image quality in an imaging apparatus comprising a split colorimetric-type white balance control device which splits the screen into predetermined areas to calculate color information, by not using a colorimetric area including the smear occurrence area for measurement of color information.

While the present embodiment has been arranged so that a photometric area containing a smear occurrence area is not used for photometry, the present embodiment may alternatively be arranged so that, for instance, weighting on the area containing a smear occurrence area is reduced when performing photometry. In addition, weighting on a calorimetric area containing a smear occurrence area may be reduced when performing colorimetry.

Fourth Embodiment

Figure 14:
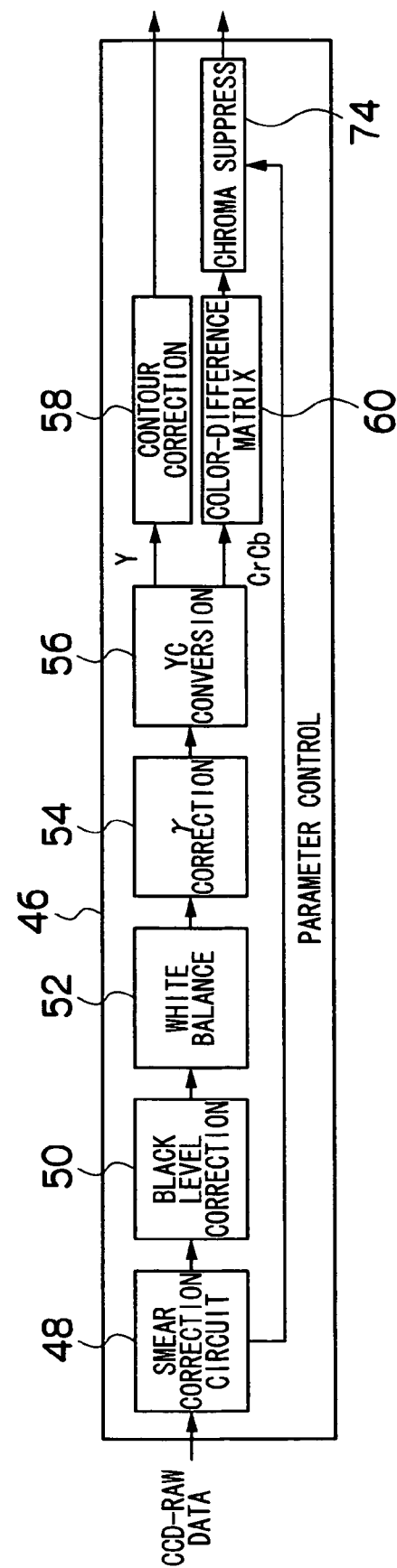
FIG. 14 is a block diagram showing an image signal processing circuit according to a fourth embodiment of the present invention.

A fourth embodiment of the present embodiment will now be described. FIG. 14 is a block diagram showing an image signal processing circuit according to the fourth embodiment of the present invention. As shown in FIG. 14, an image signal processing circuit 46 comprises a smear correction circuit 48, a black level correction circuit 50, a white balance adjustment circuit 52, a gamma correction circuit 54, a YC conversion circuit 56, a contour correction circuit 58 and a color-difference matrix circuit 60, and further comprises a chroma suppress function section 74. Since the smear correction circuit 48 is similar to that shown in FIG. 8, a description thereof will be omitted.

Figure 15:
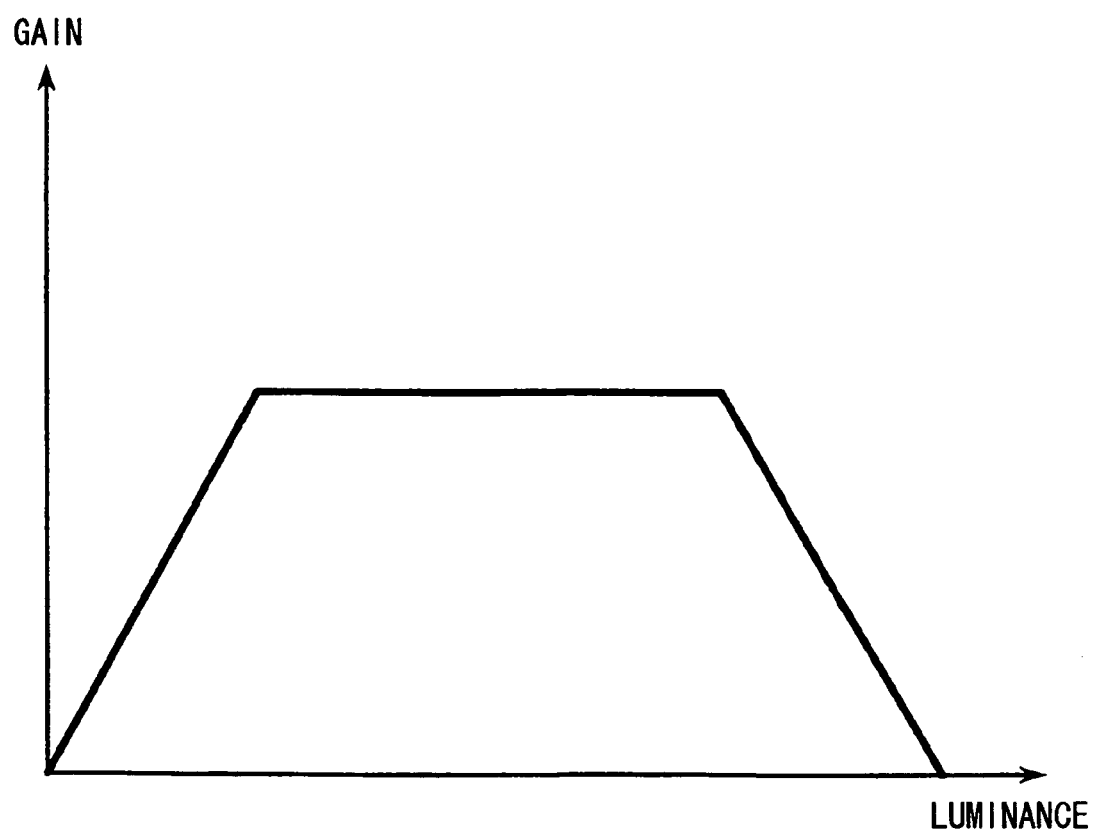
FIG. 15 is a graph showing exemplary parameters of chroma suppress processing.

The chroma suppress function section 74 performs chromatic modulation processing (chroma suppressing) on color-corrected color-difference data "Cr" and "Cb" inputted from the color difference matrix circuit 60. At the chroma suppress function section 74, parameters used in chroma suppress processing are adjusted based on a smear occurrence proportion calculated by the smear occurrence proportion calculation/storage circuit 118 (refer to FIG. 8) of the smear correction circuit 48. For instance, by weighting parameters of chroma suppress processing to suppress chroma saturation, a smear in a smear occurrence area may be made less noticeable. Similarly, by reducing a gain applied to high-luminance and low-luminance areas as shown in FIG. 15, smears may be made less noticeable.

According to the present embodiment, occurrences of color noises in blown highlights attributable to occurrences of smears (including blooming) may be reduced.

Fifth Embodiment

Figure 16:
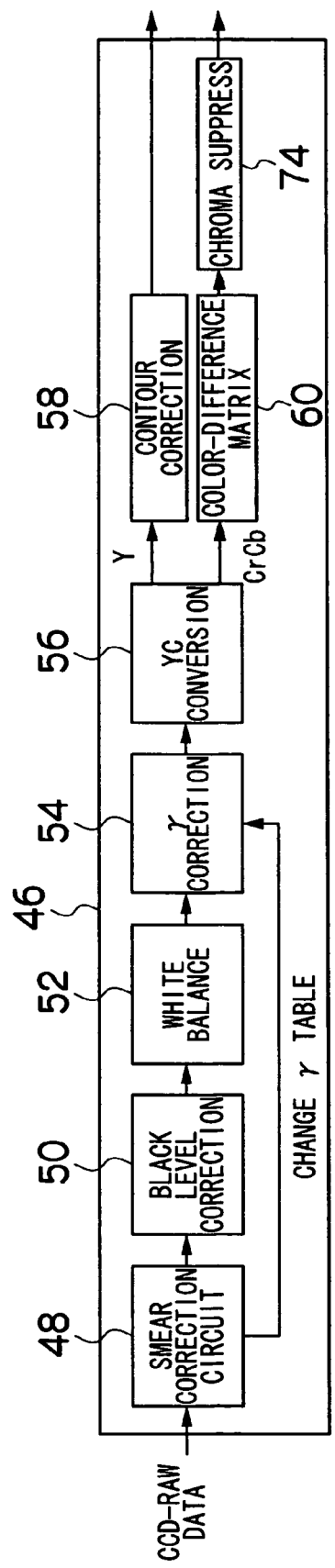
FIG. 16 is a block diagram showing an image signal processing circuit according to a fifth embodiment of the present invention.

A fifth embodiment of the present embodiment will now be described. FIG. 16 is a block diagram showing an image signal processing circuit according to the fifth embodiment of the present invention. Since the smear correction circuit 48 is similar to that shown in FIG. 8, a description thereof will be omitted. As shown in FIG. 16, a smear occurrence proportion calculated by the smear occurrence proportion calculation/storage circuit 118 (refer to FIG. 8) of the smear correction circuit 48 is inputted to the gamma correction circuit 54 of the present invention. A γ table used for γ correction is selected based on the inputted smear occurrence proportion.

Figure 17:
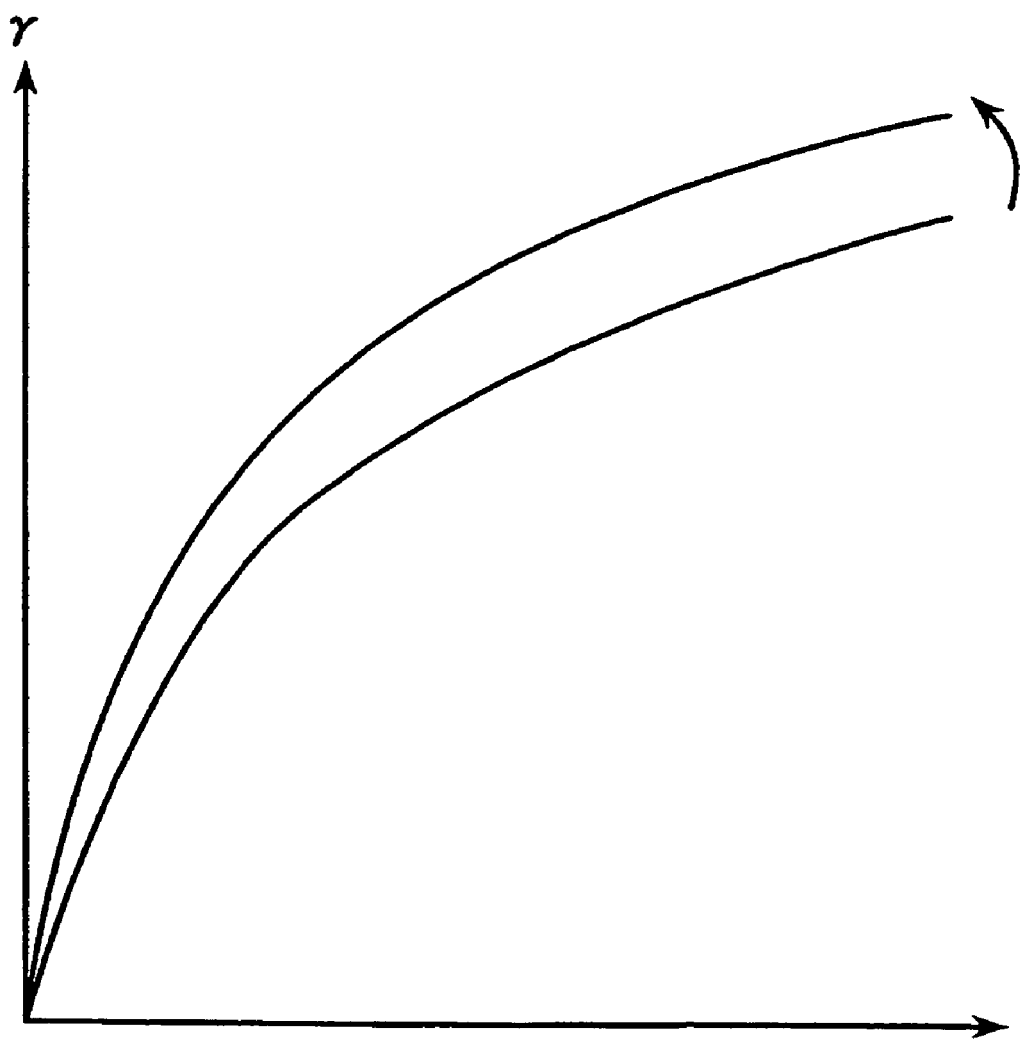
FIG. 17 is a graph showing an exemplary γ table.

FIG. 17 is a graph showing an exemplary γ table. As shown in FIG. 17, when the smear occurrence proportion is significant, or, in other words, when the proportion of the smear occurrence area to the entire screen is significant, a γ table with a steep gradient is selected. This results in an output with less shadow detail, thereby making smears less prominent.

According to the present embodiment, a γ table in accordance with a varied dynamic range may be selected in the event that a variation in the dynamic range is caused by occurrences of smears (including blooming).

Sixth Embodiment

While the respective embodiments described above have been arranged to detect smear occurrences during imaging, smear occurrences may instead be detected during live view mode prior to imaging in order to detect smear correction values.

Figure 18:
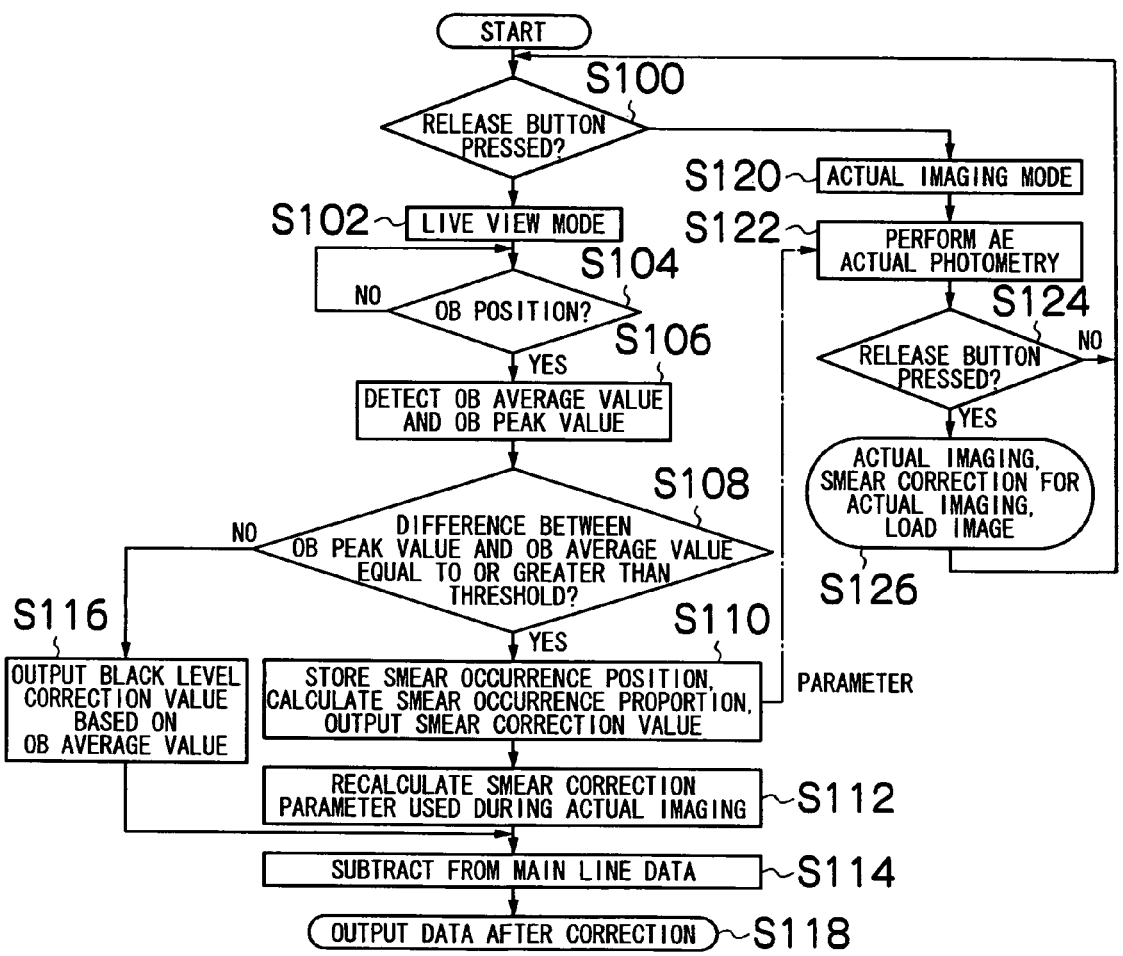
FIG. 18 is a flowchart for illustrating a flow of processing of a smear correction method according to a sixth embodiment of the present invention.

FIG. 18 is a flowchart for illustrating a flow of processing of a smear correction method according to a sixth embodiment of the present invention. First, after the imaging apparatus is powered on, live view mode is executed before the release button is pressed (No in step S100), and a live view is displayed on the LCD 66 (step S102). While all pixels in the effective pixel area will not be read out during live view mode, image signals of all pixels in the effective pixel area will be read out during actual imaging mode.

When data (CCD-RAW data) is inputted from the AFE 30 during live view mode, determination is made on whether the data is related to an OB area (step S104). If it is determined that the data relates to an OB area, an average value of all the data of the OB area (average OB value) is calculated, and eight lines' worth of data of the OB area 16 is vertically averaged to calculate a data sequence for one line (OB peak value) (step S106).

Next, for each horizontal pixel position, determination is made on whether the difference between the OB peak value at the pixel position and the OB average value is equal to or greater than a predetermined threshold (step S108). If the difference is equal to or greater than the predetermined threshold (Yes in step S108), a horizontal pixel position (smear occurrence position) "x" is acquired by the smear detection circuit 110 and stored in the smear occurrence position storage circuit 116, and at the same time, the smear occurrence proportion calculation/storage circuit 118 calculates a smear occurrence proportion. In addition, the smear correction value calculation circuit 112 outputs the difference between the OB peak value at the pixel position and the OB average value as a smear correction value to the subtraction circuit 114 (step S110). Subsequently, a smear correction parameter to be used during actual imaging is re-calculated (step S112). The smear correction parameters herein refer to the smear correction value in regards to pixels in the vicinity of the smear occurrence position, calculated based on the smear correction value calculated in the above-described step S110, the black level correction value calculated based on the smear occurrence proportion, the unused photometric area and calorimetric area, a parameter used in chroma suppress processing, the γ table and the like.

Next, the subtraction circuit 114 subtracts the smear correction value calculated in the above-described step S110 and the smear correction parameter calculated in the above-described step S112 from the main line data (step S114) to perform smear correction.

On the other hand, if the difference is below the predetermined threshold (No in step S108), the black level correction circuit 50 calculates black level correction data based on the OB average value calculated in step S106, and outputs the black level correction data to the subtraction circuit 114 (step S116). The subtraction circuit 114 then subtracts the black level correction value from the main line data (step S114) to perform black level correction.

Next, after data corrected in the above-described step S114 is outputted to the image signal processing circuit 46, the procedure returns to the processing in step S100. During live view mode, or, in other words, before the release button is pressed, processing from step S100 to step S118 is repetitively executed at a predetermined time interval (for instance, for each read-out timing of signals from the CCD image sensor 10).

Next, when the release button is pressed (halfway-pressed) (Yes in step S100), the mode transits to actual imaging mode (step S120). When actual photometry for AE is performed (step S122) and the release button is fully pressed (Yes in step S124), smear correction is performed on a digital signal of the captured image using the parameters calculated in the above-described steps S110 and S112, image signals are loaded (step S126), and the procedure returns to the processing in step S100.

According to the present embodiment, the time required for acquiring exposure conditions during actual imaging may be reduced by detecting in advance a smear occurrence to detect and store a smear correction value or a smear occurrence proportion during live view mode prior to imaging, and by using such stored parameters for smear correction during photometry prior to imaging.

Seventh Embodiment

Figure 19:
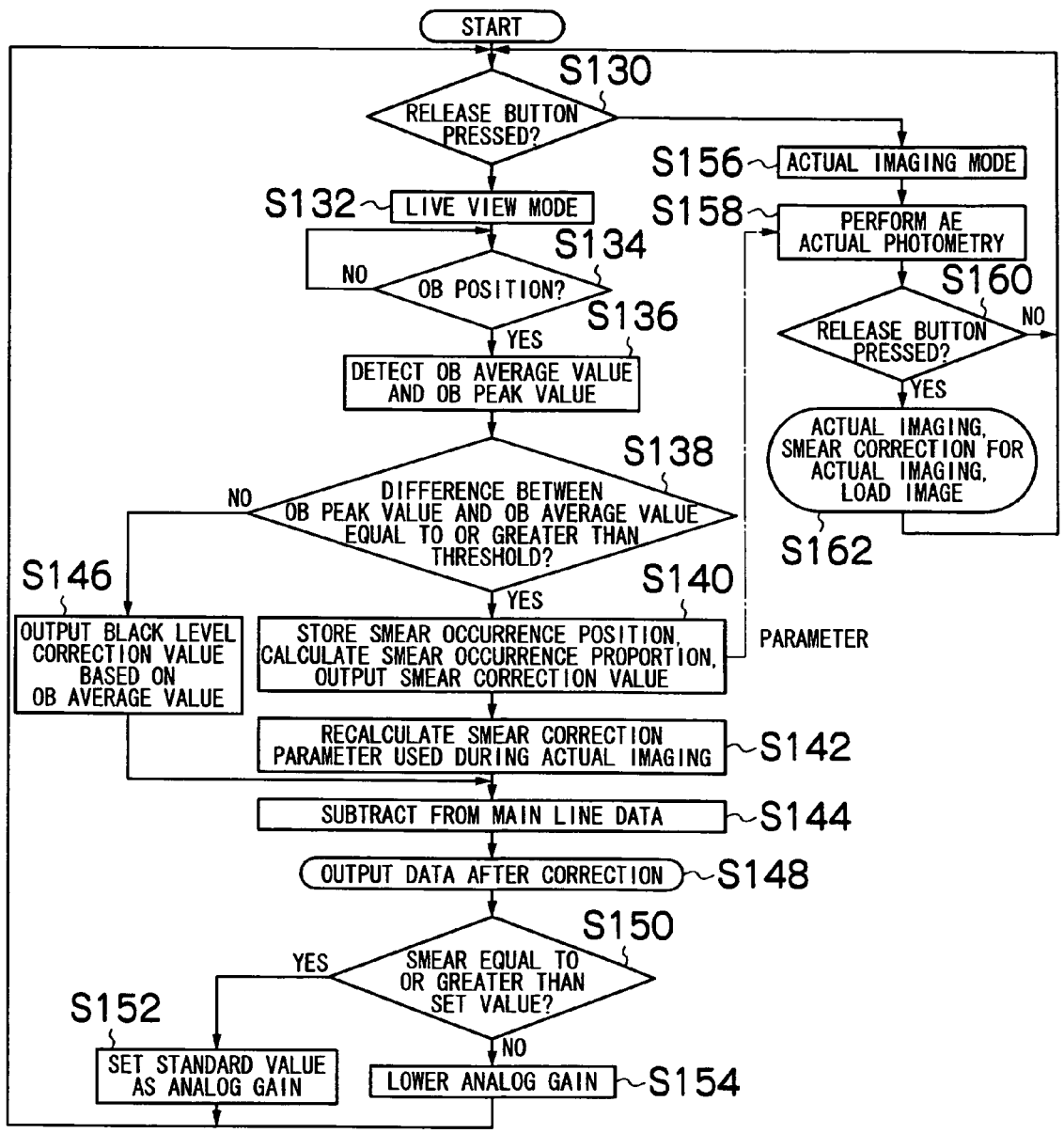
FIG. 19 is a flowchart for illustrating a flow of processing of a smear correction method according to a seventh embodiment of the present invention.

FIG. 19 is a flowchart for illustrating a flow of processing of a smear correction method according to a seventh embodiment of the present invention. The processing from step S130 to step S148, and from step S156 to step S162 are respectively similar to processing from step S100 to step S118 and from step S120 to step S126. Therefore, descriptions thereof will be omitted.

Figure 20:
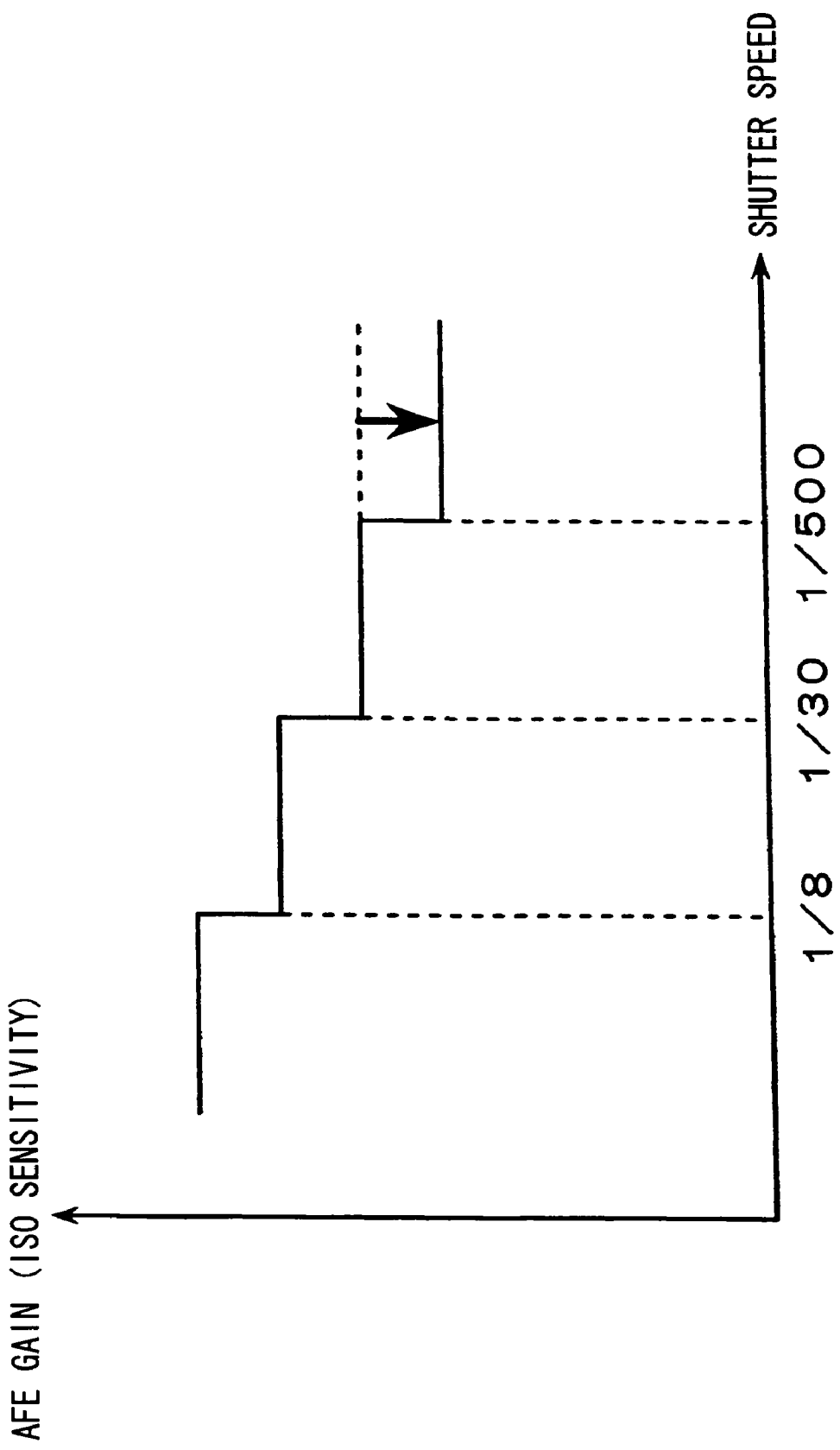
FIG. 20 is a graph schematically illustrating a relationship between analog gain and shutter speed.

In the present embodiment, processing proceeds from step S148 to step S150. When a smear is equal to or greater than a predetermined value, or, in other words, when a smear occurrence proportion or a smear correction value calculated in step S140 is equal to or greater than a predetermined value (Yes in step S150), as shown in FIG. 20, an analog gain (corresponding to ISO sensitivity) applied to an image signal by the AFE 30, set according to shutter speed is lowered from a standard value (default value) (step S152), and the procedure returns to the processing of step S130. On the other hand, if the smear is less than a predetermined value (No in step S150), the standard value (default value) is set as the analog gain (step S154), and the procedure returns to the processing of step S130.

According to the present embodiment, by detecting in advance smear occurrences to detect smear correction values during live view mode prior to actual imaging, the time required from execution of imaging to smear correction may be reduced. In addition, when a smear has occurred in a wide area across the entire screen or when a smear is intense, influences of the smear may be reduced to improve image quality by lowering analog gain or ISO sensitivity. Furthermore, by lowering analog gain, degradation of image quality may be suppressed even when a smear has high intensity, and toughness of image quality towards smear intensity may be improved.

What is claimed is:

1. An imaging apparatus comprising:
   a solid-state image sensor having an effective pixel area and an optical black area;
   a smear detection device which detects smear intensity and smear occurrence position in a smear occurrence area, which is an area where a smear occurs in the effective pixel area, based on an output signal obtained from the optical black area of the solid-state image sensor; and
   a smear correction device which performs smear correction by subtracting a smear correction value corresponding to the smear intensity from an output signal of the smear occurrence position and the vicinity thereof in the effective pixel area;
   a photometry device which calculates exposure conditions by splitting the effective pixel area into a plurality of photometric areas; and
   an exposure control device which performs exposure control based on the calculated exposure conditions,
   wherein the photometry device either reduces weighting on the output signals in a photometric area located at the smear occurrence position or at the smear occurrence position and its vicinity, or does not use the output signals in the photometric area located at the smear occurrence position or at the smear occurrence position and its vicinity during calculation of the exposure conditions.

2. An imaging apparatus comprising:
   a solid-state image sensor having an effective pixel area and an optical black area;
   a smear detection device which detects smear intensity and smear occurrence position in a smear occurrence area, which is an area where a smear occurs in the effective pixel area, based on an output signal obtained from the optical black area of the solid-state image sensor;
   a smear occurrence proportion calculation device which calculates a smear occurrence proportion which is the proportion of the area of the smear occurrence area to the entire effective pixel area; and a black level correction device which performs black level correction by calculating a black level correction value based on the smear occurrence proportion and subtracting the black level correction value from all output signals of the effective pixel area;

a photometry device which calculates exposure conditions by splitting the effective pixel area into a plurality of photometric areas; and an exposure control device which performs exposure control based on the calculated exposure conditions, wherein the photometry device either reduces weighting on the output signals in a photometric area located at the smear occurrence position or at the smear occurrence position and its vicinity, or does not use the output signals in the photometric area located at the smear occurrence position or at the smear occurrence position and its vicinity during calculation of the exposure conditions.

3. The imaging apparatus according to claim 2, further comprising
a gamma correction device which performs gamma correction on the digital signal based on predetermined γ tables,
wherein the gamma correction device selects a γ table according to the smear occurrence proportion.

4. An imaging apparatus comprising:
a solid-state image sensor having an effective pixel area and an optical black area;
a smear detection device which detects smear intensity and smear occurrence position in a smear occurrence area, which is an area where a smear occurs in the effective pixel area, based on an output signal obtained from the optical black area of the solid-state image sensor;
a smear correction device which performs smear correction by subtracting a smear correction value corresponding to the smear intensity from an output signal of the smear occurrence position and the vicinity thereof in the effective pixel area;
a smear occurrence proportion calculation device which calculates a smear occurrence proportion which is the proportion of the area of the smear occurrence area to the entire effective pixel area;
a black level correction device which performs black level correction by calculating a black level correction value based on the smear occurrence proportion and subtracting the black level correction value from all output signals of the effective pixel area;
a photometry device which calculates exposure conditions by splitting the effective pixel area into a plurality of photometric areas; and
an exposure control device which performs exposure control based on the calculated exposure conditions,
wherein the photometry device either reduces weighting on the output signals in a photometric area located at the smear occurrence position or at the smear occurrence position and its vicinity, or does not use the output signals in the photometric area located at the smear occurrence position or at the smear occurrence position and its vicinity during calculation of the exposure conditions.

5. The imaging apparatus according to claim 4, further comprising
a gamma correction device which performs gamma correction on the digital signal based on predetermined γ tables,
wherein the gamma correction device selects a γ table according to the smear occurrence proportion.

6. An imaging apparatus comprising:
a solid-state image sensor having an effective pixel area and an optical black area;
a smear detection device which detects smear intensity and smear occurrence position in a smear occurrence area, which is an area where a smear occurs in the effective pixel area, based on an output signal obtained from the optical black area of the solid-state image sensor;
a smear correction device which performs smear correction by subtracting a smear correction value corresponding to the smear intensity from an output signal of the smear occurrence position and the vicinity thereof in the effective pixel area;
a color information acquisition device which splits the effective pixel area into a plurality of colorimetric areas and respectively acquires color information from each colorimetric area;
a white balance gain calculation device which calculates white balance gain based on the color information; and
a white balance control device which performs white balance control based on the calculated white balance gain,
wherein the white balance gain calculation device either reduces weighting on the color information in a photometric area located at the smear occurrence position or at the smear occurrence position and its vicinity, or does not use the color information in the photometric area located at the smear occurrence position or at the smear occurrence position and its vicinity during calculation of the white balance gain.

7. An imaging apparatus comprising:
a solid-state image sensor having an effective pixel area and an optical black area;
a smear detection device which detects smear intensity and smear occurrence position in a smear occurrence area, which is an area where a smear occurs in the effective pixel area, based on an output signal obtained from the optical black area of the solid-state image sensor;
a smear occurrence proportion calculation device which calculates a smear occurrence proportion which is the proportion of the area of the smear occurrence area to the entire effective pixel area;
a black level correction device which performs black level correction by calculating a black level correction value based on the smear occurrence proportion and subtracting the black level correction value from all output signals of the effective pixel area;
a color information acquisition device which splits the effective pixel area into a plurality of colorimetric areas and respectively acquires color information from each colorimetric area;
a white balance gain calculation device which calculates white balance gain based on the color information; and
a white balance control device which performs white balance control based on the calculated white balance gain,
wherein the white balance gain calculation device either reduces weighting on the color information in a photometric area located at the smear occurrence position or at the smear occurrence position and its vicinity, or does not use the color information in the photometric area located at the smear occurrence position or at the smear occurrence position and its vicinity during calculation of the white balance gain.

8. The imaging apparatus according to claim 7, further comprising
a gamma correction device which performs gamma correction on the digital signal based on predetermined γ tables, wherein the gamma correction device selects a γ table according to the smear occurrence proportion.

9. An imaging apparatus comprising:
a solid-state image sensor having an effective pixel area and an optical black area;
a smear detection device which detects smear intensity and smear occurrence position in a smear occurrence area, which is an area where a smear occurs in the effective pixel area, based on an output signal obtained from the optical black area of the solid-state image sensor;
a smear correction device which performs smear correction by subtracting a smear correction value corresponding to the smear intensity from an output signal of the smear occurrence position and the vicinity thereof in the effective pixel area;
a smear occurrence proportion calculation device which calculates a smear occurrence proportion which is the proportion of the area of the smear occurrence area to the entire effective pixel area;
a black level correction device which performs black level correction by calculating a black level correction value based on the smear occurrence proportion and subtracting the black level correction value from all output signals of the effective pixel area;
a color information acquisition device which splits the effective pixel area into a plurality of colorimetric areas and respectively acquires color information from each colorimetric area;
a white balance gain calculation device which calculates white balance gain based on the color information; and
a white balance control device which performs white balance control based on the calculated white balance gain,
wherein the white balance gain calculation device either reduces weighting on the color information in a photometric area located at the smear occurrence position or at the smear occurrence position and its vicinity, or does not use the color information in the photometric area located at the smear occurrence position or at the smear occurrence position and its vicinity during calculation of the white balance gain.

10. The imaging apparatus according to claim 9, further comprising
a gamma correction device which performs gamma correction on the digital signal based on predetermined γ tables,
wherein the gamma correction device selects a γ table according to the smear occurrence proportion.

11. An imaging apparatus comprising:
a solid-state image sensor having an effective pixel area and an optical black area;
a smear detection device which detects smear intensity and smear occurrence position in a smear occurrence area, which is an area where a smear occurs in the effective pixel area, based on an output signal obtained from the optical black area of the solid-state image sensor;
a smear occurrence proportion calculation device which calculates a smear occurrence proportion which is the proportion of the area of the smear occurrence area to the entire effective pixel area;
a black level correction device which performs black level correction by calculating a black level correction value based on the smear occurrence proportion and subtracting the black level correction value from all output signals of the effective pixel area; and
a chroma suppress processing device which performs chroma suppress processing to adjust saturation of a digital signal,
wherein the chroma suppress processing device alters parameters of chroma suppress processing according to the smear occurrence proportion.

12. The imaging apparatus according to claim 11, further comprising
a gamma correction device which performs gamma correction on the digital signal based on predetermined γ tables,
wherein the gamma correction device selects a γ table according to the smear occurrence proportion.

13. An imaging apparatus comprising:
a solid-state image sensor having an effective pixel area and an optical black area;
a smear detection device which detects smear intensity and smear occurrence position in a smear occurrence area, which is an area where a smear occurs in the effective pixel area, based on an output signal obtained from the optical black area of the solid-state image sensor;
a smear correction device which performs smear correction by subtracting a smear correction value corresponding to the smear intensity from an output signal of the smear occurrence position and the vicinity thereof in the effective pixel area;
a smear occurrence proportion calculation device which calculates a smear occurrence proportion which is the proportion of the area of the smear occurrence area to the entire effective pixel area;
a black level correction device which performs black level correction by calculating a black level correction value based on the smear occurrence proportion and subtracting the black level correction value from all output signals of the effective pixel area; and
a chroma suppress processing device which performs chroma suppress processing to adjust saturation of a digital signal,
wherein the chroma suppress processing device alters parameters of chroma suppress processing according to the smear occurrence proportion.

14. The imaging apparatus according to claim 13, further comprising
a gamma correction device which performs gamma correction on the digital signal based on predetermined γ tables,
wherein the gamma correction device selects a γ table according to the smear occurrence proportion.

15. An imaging apparatus comprising:
a solid-state image sensor having an effective pixel area and an optical black area;
a smear detection device which detects smear intensity and smear occurrence position in a smear occurrence area, which is an area where a smear occurs in the effective pixel area, based on an output signal obtained from the optical black area of the solid-state image sensor;
a smear correction device which performs smear correction by subtracting a smear correction value corresponding to the smear intensity from an output signal of the smear occurrence position and the vicinity thereof in the effective pixel area;
a smear occurrence proportion calculation device which calculates a smear occurrence proportion which is the proportion of the area of the smear occurrence area to the entire effective pixel area; and
a black level correction device which performs black level correction by calculating a black level correction value based on the smear occurrence proportion and subtracting the black level correction value from all output signals of the effective pixel area, the imaging apparatus having a live view mode which displays a live view on a display screen and an actual imaging mode for performing taking of an image, based on a digital signal obtained from the solid-state image sensor, further comprises a storage device which stores the smear correction value and the smear occurrence proportion when a smear is detected by the smear detection device, during the live view mode, wherein the smear correction device performs smear correction based on the stored smear correction value and smear occurrence proportion when performing photometry under the actual imaging mode.

16. The imaging apparatus according to claim 15, further comprising a device which lowers the gain applied to the output signal read out from the solid-state image sensor when either the smear correction value is equal to or greater than a predetermined value, or the smear occurrence proportion is equal to or greater than a predetermined value.

17. The imaging apparatus according to claim 15, further comprising a gamma correction device which performs gamma correction on the digital signal based on predetermined γ tables, wherein the gamma correction device selects a γ table according to the smear occurrence proportion.

* * * * *